(12) United States Patent
Choi

(10) Patent No.: US 12,745,261 B2
(45) Date of Patent: Sep. 22, 2026

(54) METHOD AND APPARATUS FOR CONFIGURING DOWNLINK CONTROL CHANNEL IN WIRELESS BACKHAUL SYSTEM

(71) Applicant: ELECTRONICS AND TELECOMMUNICATIONS RESEARCH INSTITUTE, Daejeon (KR)

(72) Inventor: Eun Young Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 318 days.

(21) Appl. No.: 18/398,741

(22) Filed: Dec. 28, 2023

(65) Prior Publication Data

US 2024/0224291 A1 Jul. 4, 2024

(30) Foreign Application Priority Data

Dec. 29, 2022 (KR) ........................ 10-2022-0189166

(51) Int. Cl.
*H04W 72/232* (2023.01)
*H04L 1/00* (2006.01)
*H04L 1/1607* (2023.01)

(52) U.S. Cl.
CPC ......... *H04W 72/232* (2023.01); *H04L 1/0061* (2013.01); *H04L 1/1614* (2013.01)

(58) Field of Classification Search
CPC ............ H04W 72/232; H04W 72/1263; H04L 1/0061; H04L 1/1614; H04L 1/0006; H04L 1/004; H04L 1/1812; H04L 1/0071; H04L 1/0052
USPC .......................................................... 370/329
See application file for complete search history.

(56) References Cited

U.S. PATENT DOCUMENTS 10,075,946 B2 9/2018 Ko et al.
10,849,117 B2 11/2020 Sarkis et al.
11,388,695 B2 7/2022 Islam et al.
2013/0003639 A1* 1/2013 Noh ...................... H04L 5/0094 370/312
2014/0355531 A1* 12/2014 Han ..................... H04J 11/0036 370/329
2015/0312927 A1 10/2015 Ko et al.
2017/0048026 A1* 2/2017 Park ...................... H04L 1/1812
2019/0053208 A1 2/2019 Zhang et al.
2019/0097756 A1 3/2019 Chatterjee et al.
2020/0228236 A1* 7/2020 Xi ......................... H04L 1/0071
(Continued)

FOREIGN PATENT DOCUMENTS

KR 1020200080255 A 7/2020
KR 102443323 B1 9/2022
WO 2022040895 A1 3/2022

*Primary Examiner* — Jungwon Chang
(74) *Attorney, Agent, or Firm* — Rabin & Berdo, P.C.

(57) ABSTRACT

A control channel transmission method of a transmitting node may comprise: generating cyclic redundancy check (CRC) bits based on downlink control information (DCI) to be transmitted to a first receiving node; masking some bits of the CRC bits with a radio network temporary identifier (RNTI), the some bits being determined by a masking offset, and the RNTI being assigned to identify the first receiving node; and transmitting a control channel to the first receiving node, the control channel including the DCI, the masked some bits, and not-masked CRC bits.

14 Claims, 13 Drawing Sheets

(56) References Cited

U.S. PATENT DOCUMENTS

2020/0403728 A1* 12/2020 Chen .................... H04L 1/0061
2020/0412482 A1* 12/2020 Zhang .................. H04L 1/0052
2021/0392627 A1 12/2021 Kim et al.
2021/0400687 A1* 12/2021 Yeo .................. H04W 72/1263
2022/0132541 A1 4/2022 Kim et al.
2023/0337287 A1* 10/2023 Yang .................. H04W 72/232

* cited by examiner

FIG. 3B
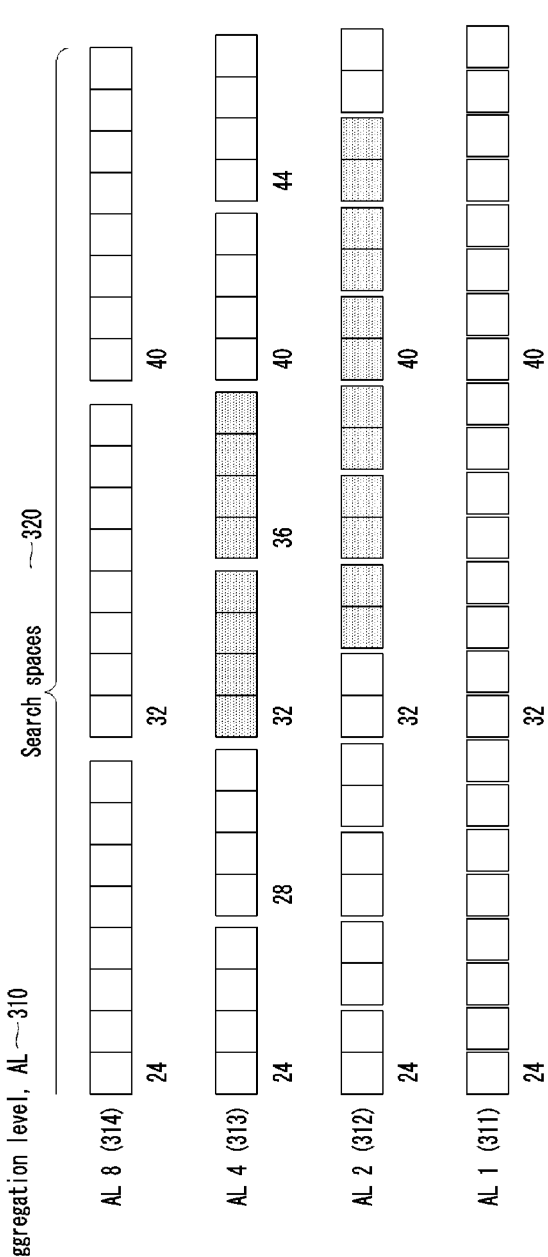
Aggregation level, AL ~310
Search spaces ~320
AL 8 (314)
AL 4 (313)
AL 2 (312)
AL 1 (311)
24
28
32
36
40
44

METHOD AND APPARATUS FOR CONFIGURING DOWNLINK CONTROL CHANNEL IN WIRELESS BACKHAUL SYSTEM

CROSS-REFERENCE TO RELATED APPLICATIONS

This application claims priority to Korean Patent Application No. 10-2022-0189166, filed on Dec. 29, 2022, with the Korean Intellectual Property Office (KIPO), the entire contents of which are hereby incorporated by reference.

BACKGROUND

1. Technical Field

Exemplary embodiments of the present disclosure relate to a technique for configuring a downlink control channel in a wireless communication system, and more specifically, to a technique for configuring a downlink control channel in a communication system having wireless backhaul.

2. Related Art

In a cellular communication network, a terminal (e.g., user equipment (UE)) generally transmits and receives data units through a base station. For instance, when there is a data unit to be transmitted to a second terminal, a first terminal generates a message containing the data unit intended for the second terminal. The first terminal then transmits the generated message to the first base station to which it belongs. The first base station receives the message from the first terminal and identifies the second terminal as the destination of the received message. Subsequently, the first base station transmits the message to the second base station to which the identified destination (i.e., the second terminal) belongs. The second base station receives the message from the first base station and identifies the second terminal as the destination of the received message. The second base station then transmits the message to the identified destination, which is the second terminal. Finally, the second terminal receives the message from the second base station and retrieves the data unit included in the received message.

Meanwhile, in a communication system, a link that connects a core network and each base station is commonly referred to as a backhaul link. Recently, with the shift of base station frequencies to the ultra-high frequency band, the necessity for installing a considerably larger number of base stations has arisen compared to the past. Consequently, when the backhaul link connecting the base station and the core network is established using wired connections, it imposes a significant cost burden on the service provider. Therefore, to address this challenge, a method of wirelessly connecting the backhaul links has been proposed.

In addition, with base stations operating in higher frequency bands, larger volumes of data can be transmitted at higher speeds between a base station and a terminal. The increased capability for data transmission at higher speeds between the base station and the terminal has resulted in a higher data capacity requirement for the backhaul link connecting the core network and each base station.

As the data capacity required for wireless backhaul links increases, consideration is being given to the use of ultra-high frequency bands, such as the terahertz (THz) band. This band is advantageous for securing available frequency resources among those suitable for communication. To deliver high-capacity traffic (e.g. ~Tbps) using the THz band, it is essential to ensure base station installation scalability and facilitate mobile service support in the network configuration. This is achieved by wirelessly connecting the backhaul link that connects the core network and the receiving base station.

SUMMARY

Exemplary embodiments of the present disclosure are directed to providing a method and an apparatus for configuring a downlink control channel in a wireless backhaul system.

According to a first exemplary embodiment of the present disclosure, a control channel transmission method of a transmitting node may comprise: generating cyclic redundancy check (CRC) bits based on downlink control information (DCI) to be transmitted to a first receiving node; masking some bits of the CRC bits with a radio network temporary identifier (RNTI), the some bits being determined by a masking offset, and the RNTI being assigned to identify the first receiving node; and transmitting a control channel to the first receiving node, the control channel including the DCI, the masked some bits, and not-masked CRC bits.

The masking offset may indicate a DCI format of the DCI.

The masking offset may further indicate some information of the DCI.

The masking of the some bits of the CRC bits may comprise: determining a first start index of the CRC bits based on a default offset, the default offset indicating a default position for the some bits masked with the RNTI among the CRC bits arranged from a low index to a high index; determining a second start index of the CRC bits from the first start index by using the masking offset, the second start offset indicating a position where the masking actually starts; and masking the some bits starting from the second start index with the RNTI.

The control channel transmission method may further comprise: when the second start index is greater than a last index of the CRC, determining the second start index according to a modulo operation on the second start index by a number of the CRC bits.

The masking of the some bits starting from the second start index with the RNTI may comprise: when a number of the some bits is smaller than a number of bits of the RNTI, masking CRC bits starting a lowest index with remaining bits of the RNTI.

The masking offset may indicate a start index of CRC bits not masked with the RNTI.

Different masking offsets may be used for DCI formats having a same DCI size.

The masking offset may be represented in form of a bitmap.

According to a second exemplary embodiment of the present disclosure, a transmitting node may comprise a processor, and the processor may cause the transmitting node to perform: generating cyclic redundancy check (CRC) bits based on downlink control information (DCI) to be transmitted to a first receiving node; masking some bits of the CRC bits with a radio network temporary identifier (RNTI), the some bits being determined by a masking offset, and the RNTI being assigned to identify the first receiving node; and transmitting a control channel to the first receiving node, the control channel including the DCI, the masked some bits, and not-masked CRC bits.

The masking offset may indicate a DCI format of the DCI.

The masking offset may further indicate some information of the DCI.

In the masking of the some bits of the CRC bits, the processor may further cause the transmitting node to perform: determining a first start index of the CRC bits based on a default offset, the default offset indicating a default position for the some bits masked with the RNTI among the CRC bits arranged from a low index to a high index; determining a second start index of the CRC bits from the first start index by using the masking offset, the second start offset indicating a position where the masking actually starts; and masking the some bits starting from the second start index with the RNTI.

The processor may further cause the transmitting node to perform: when the second start index is greater than a last index of the CRC, determining the second start index according to a modulo operation on the second start index by a number of the CRC bits.

In the masking of the some bits starting from the second start index with the RNTI, the processor may further cause the transmitting node to perform: when a number of the some bits is smaller than a number of bits of the RNTI, masking CRC bits starting a lowest index with remaining bits of the RNTI.

The masking offset may indicate a start index of CRC bits not masked with the RNTI.

Different masking offsets may be used for DCI formats having a same DCI size.

The masking offset may be represented in form of a bitmap.

According to a third exemplary embodiment of the present disclosure, a control channel reception method of a receiving node may comprise: receiving a control channel and channel-decoding the received control channel to generate channel-decoded control channel information; removing masking from the channel-decoded control channel information by using masking offsets possible at a position of cyclic redundancy check (CRC) bits and a radio network temporary identifier (RNTI) assigned to identify a receiving node; performing a CRC check on the channel-decoded control channel information from which the masking has been removed; and in respond to no error as a result of the CRC check, determining a format of downlink control information (DCI) transmitted through the control channel based on a masking offset used for removing the masking.

Some information of the DCI may be further obtained by using the masking offset used for removing the masking.

According to exemplary embodiments of the present disclosure, when DCI formats transmitted through control channels are extended, the DCI formats can be identified without using additional information. Additionally, even information truncated to adjust the size of DCI format can be provided to the receiving node without using additional bits.

BRIEF DESCRIPTION OF DRAWINGS

FIG. 3B is an exemplary diagram illustrating the remaining part of the case where CCEs are allocated to a search space according to a CCE aggregation level in the 5G NR system.

DETAILED DESCRIPTION OF THE EMBODIMENTS

Figure 1:
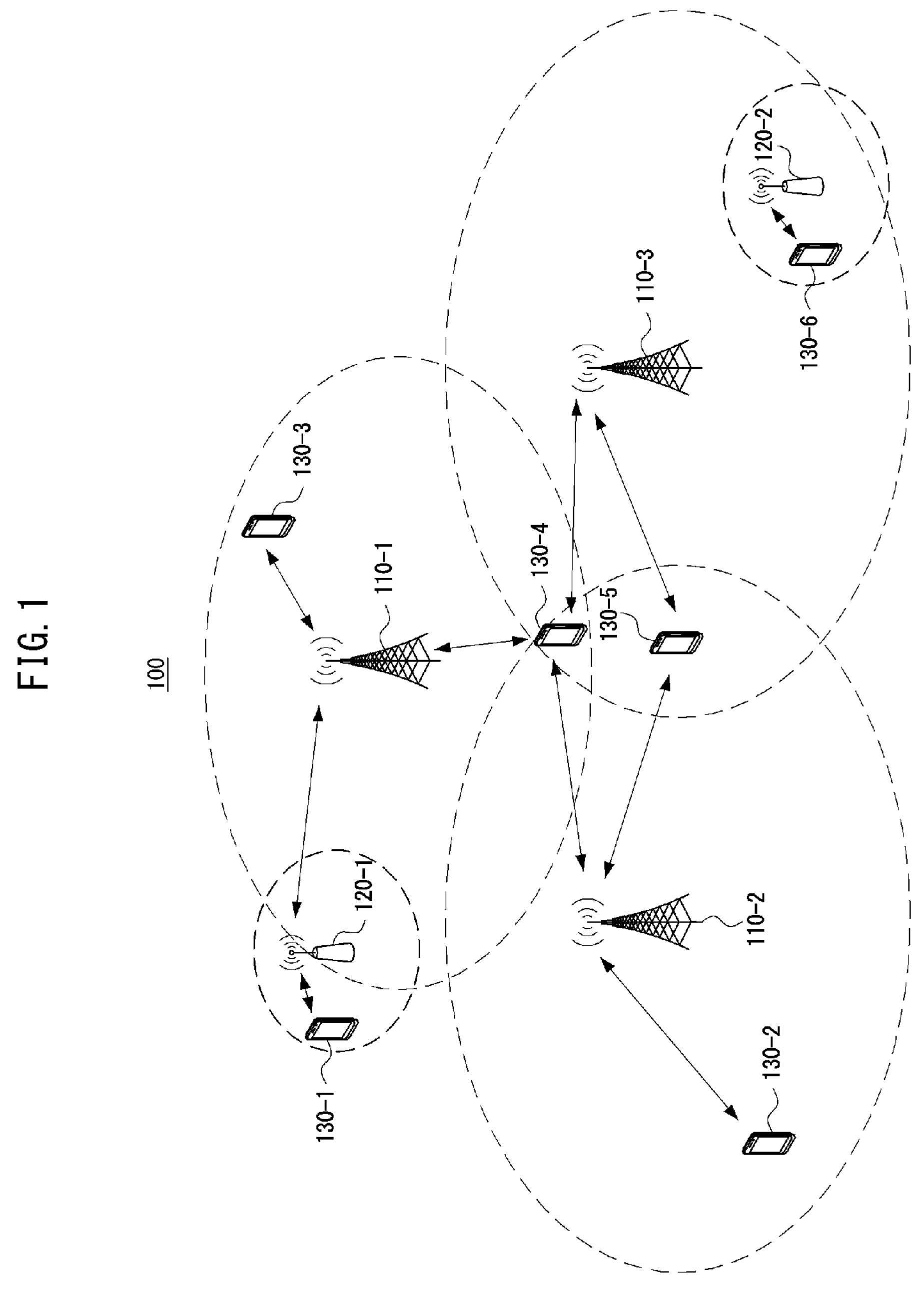
FIG. 1 is a conceptual diagram illustrating an exemplary embodiment of a communication system.

While the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term “and/or” includes any and all combinations of one or more of the associated listed items.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
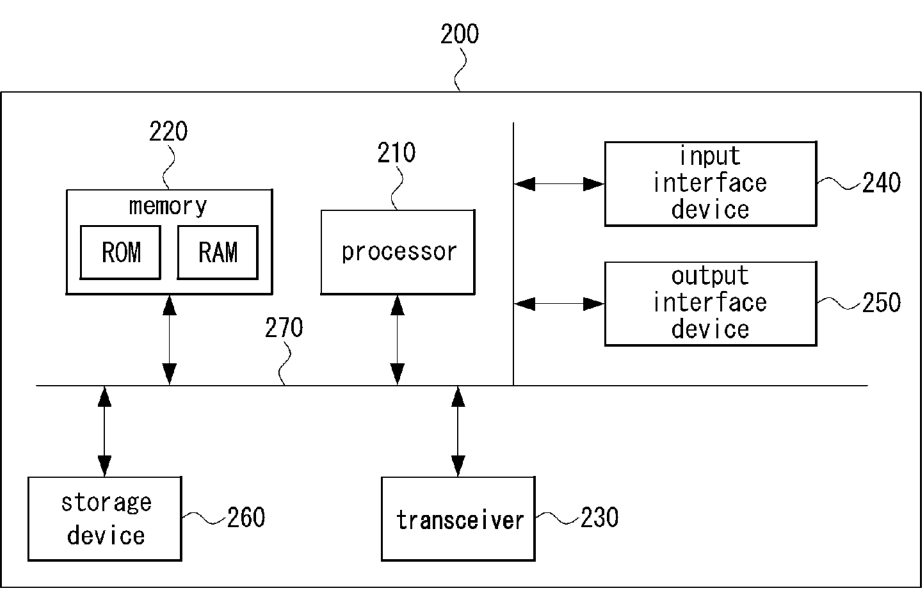
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

In a wireless communication system, a backhaul link connecting a core network and each base station is being expanded into an ultra-high frequency band, for example, a terahertz (THz) band, which is easy to secure available frequency resources among frequency bands used for communication, as a required data capacity increases. In order to provide high-capacity traffic (e.g. ~Tbps) using a THz band, it is necessary to wirelessly connect the core network and a receiving base station through a wireless backhaul to ensure base station installation scalability and ease of mobile service support in network configuration. In the wireless backhaul system, it is necessary to configure various types of control information for base station scheduling and demodulation at a downlink transmitter to support and secure the data capacity of the receiving base station within the backhaul link. The size and information content of each type of configuration information for base station scheduling and demodulation may be different. In addition, the size of transmission resources may also vary to increase reliability of a control channel and support stable reception in various environments. Since information on configuration of the control information is not explicitly given when the receiving node obtains control channel information, the receiving node needs to decode all possible configurations.

In the 3GPP LTE/NR system, a control channel comprises downlink control information (DCI) depending on a purpose, and the DCI is transmitted through physical resource allocation according to 1 to 16 aggregation levels of control channel elements (CCEs). Depending on the aggregation level, resources allocated to the control channel increase, allowing for higher reliability. The transmitting node may determine one DCI format among a plurality of DCI formats, and transmit the determined DCI format through the control channel, and the receiving node needs to detect the DCI format transmitted through the control channel without knowledge on the DCI format. In addition, the receiving node needs to perform restoration without knowledge on information related to the CCE aggregation level. The scheme in which the receiving node restores information received through the control channel without knowing information on the control channel transmitted by the transmitting node through the control channel may be referred to as 'blind decoding'. Since candidate allocation positions are determined according to the aggregation level during the blind decoding, the receiving node performs decoding wherever possible according to the limited number of blind decoding attempts.

The resource allocation for the control channel is made within a control resource set (CORESET) with a size and position configured by a network side, and one CORESET may be allocated anywhere within one slot and within one to three consecutive OFDM symbols in the time domain. In addition, one CORESET may be allocated as $$N_{RB}^{CORESET}$$

RBs within a bandwidth part in units of 6 resource blocks (RBs) in the frequency domain. In the 5G NR system, up to four bandwidth parts (BWPs) may be configured, and up to 3 CORESETs may be configured for each BWP.

One CCE may consist of six resource element groups (REGs), and one REG may be equal to one RB in one OFDM symbol. CCE-to-REG resource allocation may be performed within a CORESET without interleaving, or may be performed within a CORESET with interleaving according to a REG bundling size {2, 6}. The control channel uses QPSK as a modulation scheme, and information of 108 bits may be transmitted through resource elements (REs) excluding a demodulation reference signal (DM-RS) in one CCE. Here, an overhead due to the reference signal is ¼.

In the NR system, a physical downlink control channel (PDCCH) may be allocated in a position of possible CCEs within a CORESET, according to an aggregation level. When CCEs within the CORESET are arranged in order, a PDCCH to which a CCE aggregation level determined according to a condition such as a channel state is applied may be allocated to a position according to an interval determined by the CCE aggregation level.

Figure 3A:
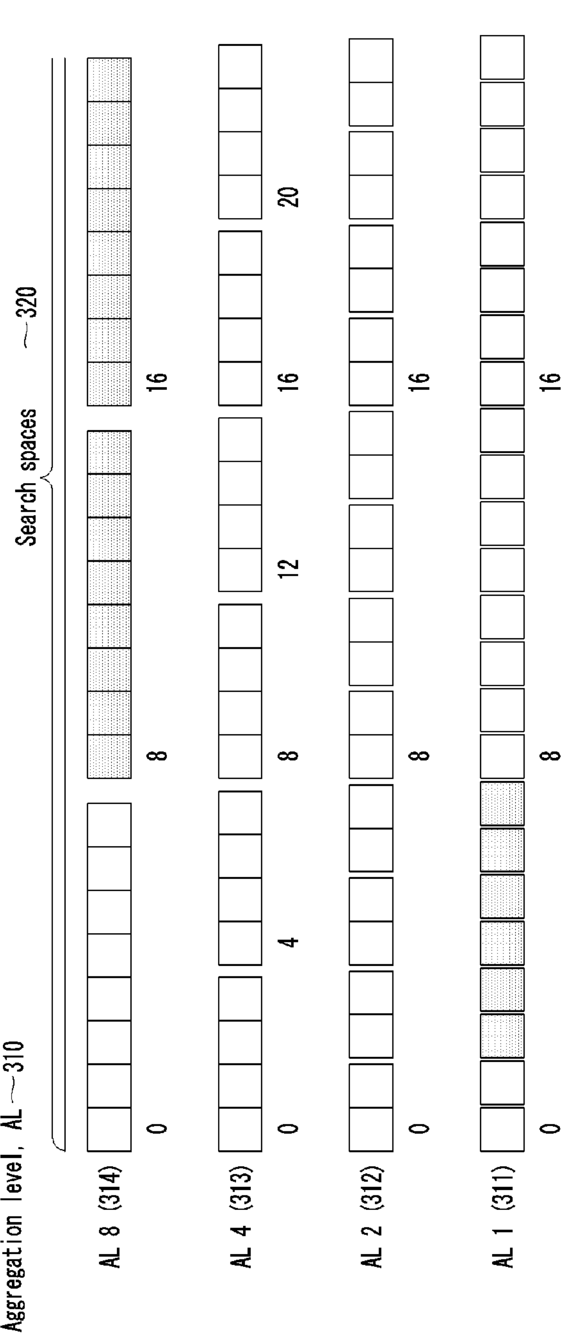
FIG. 3A is an exemplary diagram illustrating a part of a case where CCEs are allocated to a search space according to a CCE aggregation level in the 5G NR system.

FIG. 3A is an exemplary diagram illustrating a part of a case where CCEs are allocated to a search space according to a CCE aggregation level in the 5G NR system, and FIG. 3B is an exemplary diagram illustrating the remaining part of the case where CCEs are allocated to a search space according to a CCE aggregation level in the 5G NR system.

Referring to FIGS. 3A and 3B, four cases (i.e. AL 1 311, AL 2 312, AL 4 313, and AL 8 314) are illustrated as aggregation levels (ALS) 310. Additionally, search spaces 320 are illustrated to have 48 CCEs from the 0-th CCE to the 47-th CCE.

In general, for a DCI included in a PDCCH according to an aggregation level L, consecutively-numbered L CCEs may be mapped to several REGs within the CORESET. Here, the CCEs may be numbered sequentially as 0, 1, 2, . . . , and (L−1). In this case, in case of AL 4, 4 CCEs starting from each of the 0, 4, 8, . . . , and 4n-th CCE may be allocated. Through this process, a PDCCH to be transmitted is allocated to a control channel region.

Then, a receiving node (e.g. UE) may decode PDCCH(s) by using four UE-specific search space ALs (i.e. AL 1 311, AL 2 312, AL 4 313, and AL 8 314). In the following description, the receiving node will be described assuming it as a form including at least one of a UE or a distributed unit (DU) or radio unit (RU) according to the open radio access network (O-RAN) alliance communication standards. In addition, the transmitting node will be described assuming it as a form including at least one of a base station or a centralized unit (CU), DU, and/or RU according to the O-RAN communication standard.

Referring to FIGS. 3A and 3B, when the UE performs decoding assuming the case of AL 1 311, the number of PDCCH candidates may be 6, the size of CCEs may be 6, and the decoding may be performed in a search space having CCEs with indexes 2 to 7, as illustrated in FIG. 3A. In addition, when the UE performs decoding assuming the case of AL 2 312, the number of PDCCH candidates may be 6, the size of CCEs may be 12, and the decoding may be performed in a search space having CCEs with the indexes 34 to 45, as illustrated in FIG. 3B. In addition, when the UE performs decoding assuming the case of AL 4 313, the number of PDCCH candidates may be 2, the size of CCEs may be 4, and the decoding may be performed in a search space having CCEs with the indexes 32 to index 39, as illustrated in FIG. 3B. In addition, when the UE performs decoding assuming the case of AL 8 314, the number of PDCCH candidates may be 2, the size of CCEs may be 16, and the decoding may be performed in a search space having CCEs with the indexes 8 to index 23, as illustrated in FIG. 3A.

From a scheduling perspective, limiting the number of UE's blind decoding attempts for each aggregation level may reduce scheduling flexibility, and allowing all possible CCE aggregation levels may increase complexity. Therefore, the maximum number of blind decoding attempts at the UE is limited, and a search space, which is a set of candidate control channels formed from available CCEs during the same time, is configured by a scheduler.

The UE may need to find CCEs at a possible position within the search space to find its PDCCH in the control channel region. However, in the case of blind decoding, since the UE does not have information on a DCI format and CCE aggregation level for its PDCCH, the UE may need to search for all possible start positions of CCEs depending on possible CCE aggregation levels. That is, the UE need to perform blind decoding at possible start positions of CCEs depending on the types of possible CCE aggregation levels.

In this case, for a search space set s allocated to a CORESET p, CCE indexes according to an aggregation level L corresponding to a PDCCH candidate $m_{s,n_{CI}}$ of a search space set within a slot $$n_{s,f}^{\mu}$$

in an active downlink BWP may be calculated as in Equation 1 below.

$$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\lfloor N_{CCE,p}/L\rfloor\right\}+i \quad \text{[Equation 1]}$$

In Equation 1, $$Y_{p,n_{s,f}^{\mu}}=0$$

may be defined in case of a common search space, and $$Y_{p,n_{s,f}^{\mu}}=\left(A_p\cdot Y_{p,n_{s,f}^{\mu}-1}\right)$$

may be defined in case of a UE-specific search space. In this case, if p mod 3=0, $A_p$=39827 may be defined. If p mod 3=1, $A_p$=39829 may be defined, and if p mod 3=2, $A_p$=39839 may be defined. D=65537 may be defined. $N_{CCE,p}$ is the number of CCEs numbered from 0 to $N_{CCE,p}-1$ in the CORESET p.

Since the UE should perform decoding in the control channel region by considering all possible combinations of aggregation levels and positions of CCEs, the number of processes for performing blind decoding may become too large. Therefore, in order to limit complexity, the number of candidate start positions of CCEs to which PDCCHs to be decoded are allocatable is limited, thereby relieving the UE of the burden of performing blind decoding in too many regions.

In case of the LTE system, the number of processes is set to 44 so that limited processing can be performed by the UE having to perform blind decoding for each candidate aggregation level among various aggregation levels. In addition, in case of the NR system, the maximum value $$M_{PDCCH}^{max,slot,\mu}$$

of the number of PDCCH candidates for which blind decoding is to be performed for each subcarrier spacing configuration is shown in Table 1 below.

TABLE 1

| Subcarrier spacing (SCS) configuration μ | Maximum number $M_{PDCCH}^{max,slot,\mu}$ of monitored PDCCH candidates per slot and per serving cell |
|---|---|
| 0 | 44 |
| 1 | 36 |
| 2 | 22 |
| 3 | 20 |

Meanwhile, in the NR system, there are four DCI format sizes. The fallback DCI format, DCI format for downlink scheduling allocation, DCI format for uplink scheduling allocation, and DCI format for slot-format indication and preemption indication depending on a configuration are supported. Here, uplink/downlink fallback DCI formats have the same size. According to the DCI format sizes, the terminal needs to attempt to decode four DCI format sizes.

Unlike the LTE system, the NR has adopted flexible configuration by configuring each search space and setting the number of processes for each aggregation level. Here, the search space is a set of candidate control channels of a given aggregation level. Since there are multiple aggregation levels, there are multiple search spaces. A search space set may be a set of search spaces with different aggregation levels within the same CORESET. Up to 10 search space sets may be configured for each of the four BWPs.

The number of blind decoding attempts increases as more aggregation levels are supported, when a search space is wide to support multiple terminals, when multiple allocation positions need to be identified, or when there are more DCI formats to distinguish. If the size of each DCI format is different, decoding is performed using a payload size of the corresponding DCI, and then a DCI format of the restored DCI may be identified through a cyclic redundancy check (CRC) process. As a method of identifying the DCI format, DCI size, RNTI information, and/or format identifier information included in the DCI may be used.

In order to increase maximum scheduling flexibility within the limited number of blind decoding attempts, and in order to configure DCI formats having the same size and configure information that the DCI can convey as efficiently as possible in consideration of complexity of a receiving node, there is a need to design a DCI format from which information (e.g. format identifier) on the DCI format or information for demodulation can be implicitly identified or extracted.

In case of the NR system, a procedure of delivering DCI to the terminal through a PDCCH may include a process of configuring the DCI by including transmission resource allocation information of a PDSCH or PUSCH according to a DCI format as well as uplink power control indication, slot format indication, information on no transmission of PRBs for the terminal, information on OFDM symbols, and the like, and may include a process of configuring a PDCCH by determining the size of resources for transmission of the DCI for securing reliability considering a channel state of the receiving terminal.

The DCI formats for the NR system are defined for PUSCH/PDSCH scheduling and specific information transmission as shown in Table 2 and Table below, and a radio network temporary identifier (RNTI) for identification of each DCI format or identification of a receiving terminal is as shown in Table 2 and Table 3.

TABLE 2

| DCI format | Usage | RNTI |
|---|---|---|
| 0_0 | Scheduling of PUSCH in one cell | C-RNTI, CS-RNTI, MCS-C-RNTI, TC-RNTI |
| 0_1 | Scheduling of one or multiple PUSCHs in one cell, or indicating downlink feedback information for configured grant PUSCH (CG-DFI) | C-RNTI, CS-RNTI, SP-CSI-RNTI, MCS-C-RNTI |
| 0_2 | Scheduling of PUSCH in one cell | C-RNTI, CS-RNTI, SP-CSI-RNTI, MCS-C-RNTI |
| 1_0 | Scheduling of PDSCH in one cell | C-RNTI, CS-RNTI, MCS-C-RNTI, P-RNTI, SI-RNTI, RA-RNTI, MsgB-RNTI, TC-RNTI |
| 1_1 | Scheduling of one or multiple PDSCHs in one cell, and/or triggering one shot HARQ-ACK codebook feedback | C-RNTI, CS-RNTI, MCS-S-RNTI |
| 1_2 | Scheduling of PDSCH in one cell | C-RNTI, CS-RNTI, MCS-C-RNTI |
| 2_0 | Notifying a group of UEs of the slot format, available RB sets, COT duration and search space set group switching | SFI-RNTI |
| 2_1 | Notifying a group of UEs of the PRB(s) and OFDM symbol(s) where UE may assume no transmission is intended for the UE | INT-RNTI |
| 2_2 | Transmission of TPC commands for PUCCH and PUSCH | TPC-PUSCH-RNTI, TPC-PUCCH-RNTI |
| 2_3 | Transmission of a group of TPC commands for SRS transmissions by one or more UEs | TPC-SRS-RNTI |
| 2_4 | Notifying a group of UEs of the PRB(s) and OFDM symbol(s) where UE cancels the corresponding UL transmission from the UE | CI-RNTI |

TABLE 3

| DCI format | Usage | RNTI |
|---|---|---|
| 2_5 | Notifying the availability of soft resources | AI-RNTI |
| 2_6 | Notifying the power saving information outside DRX Active Time for one or more UEs | PS-RNTI |
| 2_7 | Notifying paging early indication and TRS availability indication for one or more UEs | PEI-RNTI |
| 3_0 | Scheduling of NR sidelink in one cell | SL-RNTI, SL-CS-RNTI |
| 3_1 | Scheduling of LTE sidelink in one cell | V-RNTI |
| 4_0 | Scheduling of PDSCH with CRC scrambled by MCCH-RNTI/G-RNTI for broadcast | MCCH-RNTI, G-RNTI |
| 4_1 | Scheduling of PDSCH with CRC scrambled by G-RNTI/G-CS-RNTI for multicast | G-RNTI, G-CS-RNTI |
| 4_2 | Scheduling of PDSCH with CRC scrambled by G-RNTI/G-CS-RNTI for multicast | G-RNTI, G-CS-RNTI |

To summarize some of the contents of the respective RNTIs shown in Table 2 and Table 3 above, they may be defined as follows.

SI-RNTI: System Information RNTI
P-RNTI: Paging RNTI
RA-RNTI: Random Access RNTI
TC-RNTI: Temporary Cell RNTI
C-RNTI: Cell RNTI
MCS-C-RNTI: Modulation Coding Scheme Cell RNTI
CS-RNTI: Configured Scheduling RNTI
TPC-PUCCH-RNTI: Transmit Power Control-PUCCH RNTI
TPC-PUSCH-RNTI: Transmit Power Control-PUSCH RNTI
TPC-SRS-RNTI: Transmit Power Control-Sounding Reference Signal RNTI
INT-RNTI: Interruption RNTI
SFI-RNTI: Slot Format Indication RNTI
SP-CSI-RNTI: Semi-Persistent CSI RNTI
MCS-C-RNTI: RNTI used for indicating a replacement MCS table for PDSCH and PUSCH
G-RNTI: Group RNTI
PEI-RNTI: Early Paging Indication (PEI) RNTI
SL-RNTI: Sidelink RNTI
SL-CS-RNTI: Sidelink Configured Scheduling RNTI
PS-RNTI: Power Saving RNTI According to Table 2 and Table 3 above, the usages of the DCI formats and the RNTIs available for the respective DCI formats can be identified. Also, referring to some descriptions in Table 3 above, a CRC is described as being scrambled with an RNTI. In the present disclosure, scrambling of the CRC with the RNTI may be understood as masking of the CRC with the RNTI. Therefore, in the present disclosure described below, the CRC being scrambled with the RNTI and the CRC being masked with the RNTI should be understood as having the same meaning.

When the number of DCI formats increases and the sizes of the respective DCI formats vary, the receiving terminal/base station needs to make a decoding attempt for each DCI format that needs to be attempted to be restored. In this case, as hardware complexity increases, it is necessary to configure DCI formats with the same DCI size by adjusting the DCI payload size for each DCI format to prevent an increase in the number of decoding attempts. Therefore, if necessary, the DCI sizes are adjusted to make them the same. When the DCI format 0_0 is monitored in a common search space and is smaller than a payload size of the DCI format 1_0 monitored in the same serving cell, zero-padding may be added to the DCI format 0_0 so that the size thereof becomes the same as that of the DCI format 1_0. In addition, when the payload size of the DCI format 0_0 is larger than the payload size of the DCI format 1_0 monitored within the same serving cell, the number of bits for frequency resource allocation within the DCI format 0_0 may be reduced by truncation. In the above-described manner, the payload sizes of the DCI format 0_0 and DCI format 1_0 may be adjusted to be the same, whereby they can be decoded at once.

The DCI formats are classified according to the usages and contents of information they include, and even formats with the same usage may have different sizes. In case of the NR system, there are four DCI format sizes. If the DCI format sizes are different, individual decoding is attempted for each DCI format size when demodulating a control channel. The UE may monitor three different sizes of DCI using C-RNTI and one size of DCI using a specific RNTI depending on the usage.

In case of the NR system, in order to reduce the number of decoding attempts for the DCI format 0_1 for uplink scheduling grant and the DCI format 1_1 for downlink scheduling allocation, the sizes of the two DCI formats may be matched by applying zero-padding to a DCI format having a smaller size. In the similar manner, when the DCI format 0_2 and the DCI format 1_2 are used for scheduling for the same serving cell, the payload sizes of the two DCI formats may be matched by applying zero-padding to a DCI format having a smaller size among the two DCI formats. The fallback DCI formats 0_0/1_0 and the DCI formats 0_1/1_1 and 0_2/1_2 have the same size and are formats that use a total of three C-RNTIs. The DCI formats for specific purposes include the DCI format 2_0 for transmitting slot format information, the DCI format 2_1 for transmitting preemption information, the DCI format 2_2 for uplink power control, and the DCI format 2_3 for power control of an uplink sounding reference signal. In addition, DCI format(s) may be added depending on a purpose. The added DCI format(s) may have the same size as one of the existing DCI formats and may be transmitted using an RNTI corresponding to each DCI format. If a DCI format to be added in the future has the same size as the existing DCI format, demodulation of the DCI format is possible without additional decoding attempts.

In order to configure DCI formats using the same RNTI to have the same DCI size, the DCI format payload sizes may be matched through zero-padding or truncation so that the DCIs with to-be transmitted control information of different sizes have the same size. In some cases, if there is a lot of information to be configured depending on a scenario and operating environment, and the information to be included in one DCI format is larger than the maximum DCI size, a situation may arise where the information should be additionally transmitted in a new DCI format while using the same RNTI.

In the process of adjusting the payload size by performing padding/truncation on information bits of the DCI format, an indicator may be used to distinguish DCI formats with the same DCI size. Therefore, if they can be distinguished by the indicator, different DCI formats with the same DCI size may be identified with one decoding. To deliver the same downlink resource allocation and scheduling information, DCI formats transmitted with the same size at the same time may be required. In this case, since the DCI formats have the same indicator value, the existing NR system configures the DCI formats by differentiating the DCI sizes through bit padding. In other words, the classification method based on DCI payload size leads to an increase in the number of decoding attempts.

In case of DCI formats of the same size, there may be a format identifier that can distinguish them, which means that more information transmission resources are needed. If the system has a structure in which backhaul and access networks coexist and supports transmission of large amounts of data using frequency and space resources, many resources should be utilized, and the amount of control information to be transmitted separately for each transmission mode increases. Therefore, the number of DCI formats may increase accordingly. The sizes of the DCI formats are adjusted considering the number of decoding attempts of the control channel, and as the number of DCI formats of the same size increases, the format identifiers to be distinguished increases proportionally. Therefore, resources for the format identifiers are also needed as $\log_2(N)$.

Accordingly, there is a need for a structure that can differentiate DCI formats while using the same RNTI and can transmit some information implicitly without increasing the DCI size.

The present disclosure described below proposes a method and an apparatus for securing scheduling flexibility using a control channel information format of the same size in configuring a downlink control channel to provide information for resource scheduling and demodulation of a wireless backhaul link. Additionally, the present disclosure proposes a method and an apparatus for reducing reception complexity of a receiving node. Additionally, the present disclosure proposes a method and an apparatus for distinguishing control channel information formats for control channel information of the same size.

The ultra-high frequency band is considered a candidate frequency for large-capacity transmission because it is easy to secure available resources, of which a terahertz (THz) band is a major candidate. Currently, attempts are being made to develop and apply modulation and demodulation technology suitable for high-speed transmission to backhaul and access links, which are required to provide high-capacity transmission, using a wide bandwidth of the ultra-high frequency band. In particular, in case of mobile wireless backhaul, it is necessary to configure various types of control information for base station scheduling and demodulation to support high-speed transmission and mobility.

The configuration of control information is identified by a DCI format depending on the purpose, and CRC bits are added thereto and transmitted through a control channel. Hereinafter, a DCI transmission process will be described with reference to the attached drawing.

Figure 4:
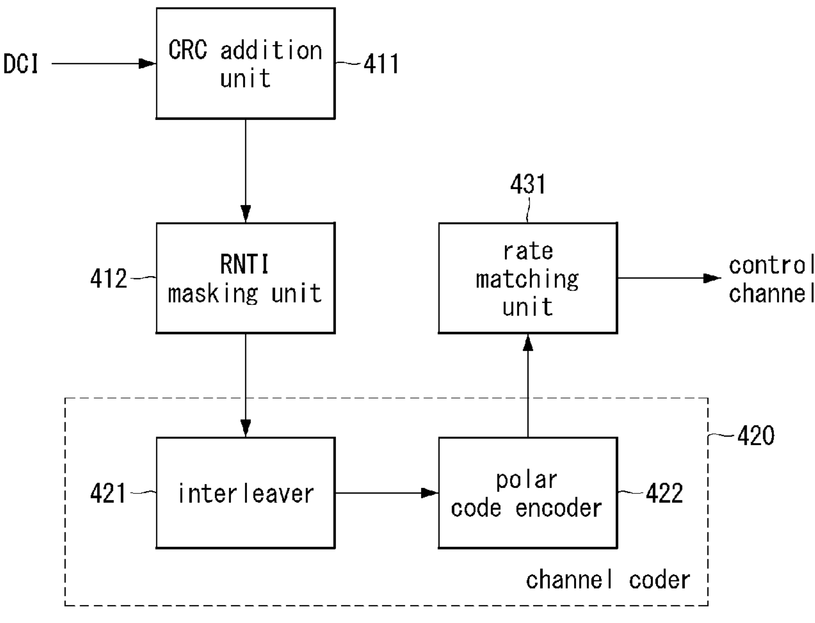
FIG. 4 is a block diagram illustrating a control channel transmitting apparatus to describe a procedure for processing DCI to be transmitted in the NR system.

FIG. 4 is a block diagram illustrating a control channel transmitting apparatus to describe a procedure for processing DCI to be transmitted in the NR system.

Referring to FIG. 4, a control channel transmitting apparatus may include a CRC addition unit 411, an RNTI masking unit 412, a channel coder 420, and a rate matching unit 431. Additionally, the channel coder 420 may include an interleaver 421 and a polar code encoder (or polar encoder) 422. It should be noted that FIG. 4 illustrates only a configuration for DCI processing in the control channel transmitting apparatus.

First, DCI, which is control information generated based on the scheme described above, may be input to the CRC addition unit 411. The CRC addition unit 411 may calculate a CRC for bits of the DCI and append it after a payload of the DCI. Hereinafter, the DCI to which the CRC is appended will be described as 'DCI to which the CRC is appended' or 'DCI' when describing processing operations after the CRC addition unit 411. This is because even if it is simply referred to as DCI, it can be seen that it is a form to which the CRC is appended by the CRC addition unit 411.

The DCI to which the CRC is appended by the CRC addition unit 411 may be input to the RNTI masking unit 412. The RNTI masking unit 412 may mask the CRC with an RNTI of a corresponding receiving node so that the receiving node that is to receive the DCI can identify the DCI. Depending on a purpose, the RNTI may be a C-RNTI or an RNTI for a specific purpose. The DCI whose CRC is masked with the RNTI of the receiving node that is to receive the DCI may be input to the channel coder 420. In the following description, the DCI masked with the RNTI will also be described as 'DCI masked with the RNTI' or 'DCI'. This may be the same reason as described above.

As described above, the channel coder 420 may include the interleaver 421 and the polar code encoder 422. The interleaver 421 may perform interleaving on the DCI to which the CRC masked with the RNTI is appended based on a preconfigured scheme. The DCI interleaved in the interleaver 421 may be input to the polar code encoder 422.

The polar code encoder 422 may encode the interleaved DCI based on a polar coding scheme used in the NR system. The polar-coded DCI output from the polar code encoder 422 may be input to the rate matching unit 431. In the following description, the polar-coded DCI will be described as 'polar-coded DCI', 'coded DCI', or 'interleaved polar-coded DCI'. This is for convenience of description and will not cause confusion because it is widely known that the DCI encoding scheme in the NR system is the polar coding scheme.

The rate matching unit 431 may perform rate matching on the encoded DCI so that the encoded DCI has a specific preset length, as described above. For example, if the length of the coded DCI is shorter than a preset length, zero-padding may be used to allow it to have the preset length, or if the length of the coded DCI is longer than the preset length, truncation may be used to allow it to have the preset length.

The rate-matched DCI output from the rate matching unit 431 may be mapped to resources for a control channel and transmitted to the receiving node. It should be noted that in FIG. 4, the configuration of mapping the rate-matched DCI to the control channel is omitted.

According to the description with reference to FIG. 4, the DCI may be transmitted to the receiving node through the control channel. Since the NR system is a wireless network, the control channel is transmitted over the air. The receiving node may receive the control channel and perform blind decoding on the resources of the control channel. In other words, as described above, the process of decoding the control channel should be performed without information on a format of the DCI transmitted through the control channel. In other words, the receiving node attempts blind decoding in which all possible sizes of resources and all candidate DCI formats are decoded without knowledge on size and DCI format information of control information. In the blind decoding process, the total number of blind decoding attempts is determined by a combination of the number of decoding attempts for the aggregation levels, which are information on resources allocated to the control channel, and the number of decoding attempts for DCI formats to be decoded at each aggregation level.

As previously described, the maximum number of decoding attempts at the receiving node is limited considering scheduling flexibility and hardware complexity. Hereinafter, a procedure for decoding the control channel at the receiving node will be described with reference to the attached drawings.

Figure 5:
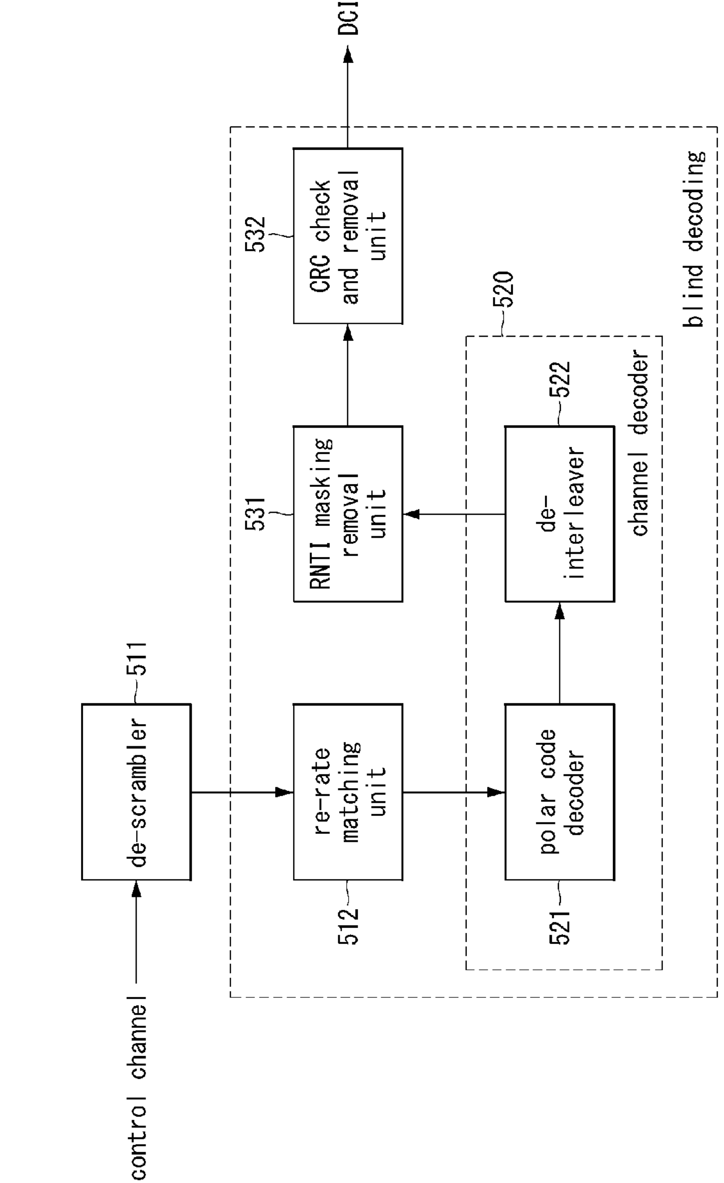
FIG. 5 is a block diagram illustrating a control channel receiving apparatus to describe a procedure for processing a received control channel in the NR system.

FIG. 5 is a block diagram illustrating a control channel receiving apparatus to describe a procedure for processing a received control channel in the NR system.

Referring to FIG. 5, a control channel receiving apparatus may include a de-scrambler 511, a re-rate matching (i.e. reverse rate matching) unit 512, a channel decoder 520, an RNTI masking control unit 531, and a CRC check and removal unit 532. Additionally, the channel decoder 520 may include a polar code decoder (i.e. polar decoder) 521 and a de-interleaver 522. It should be noted that FIG. 5 illustrates only a configuration of the control channel receiving apparatus for DCI processing corresponding to the transmitting apparatus of FIG. 4.

As previously described in FIG. 4, it can be seen that the NR system uses a polar code as a channel coding scheme for the control channel. Therefore, the control channel receiving apparatus may receive a polar-coded control channel and input it to the de-scrambler 511. The de-scrambler 511 may de-scramble the received control channel, and provide the de-scrambled signal to the re-rate matching unit 512.

The re-rate matching unit 512 may be a unit that performs a reverse operation of the rate matching unit 431 of the control channel transmitting apparatus of FIG. 4. The re-rate matching unit 512 may remove the zero-padded portion or provide information on the zero-padded portion to the channel decoder 520.

The channel decoder 520 may include a polar code decoder 521 and a de-interleaver 522, as described above. Since the data included in the control channel, that is, DCI, is transmitted as being polar-coded, the polar code decoder 521 may perform polar-code decoding on the DCI and output the decoded DCI (i.e. control channel data). The control channel data decoded in the polar code decoder 521 may be input to the de-interleaver 522.

The de-interleaver 522 may de-interleave the decoded control channel data in a reverse scheme of the scheme of interleaving the control channel data in the interleaver 421 described in FIG. 4. The decoding of the control channel may be achieved through the operations in the polar code decoder 521 and de-interleaver 522.

The channel-decoded data may be input to the RNTI masking removal unit 531. The RNTI masking removal unit 531 may remove the RNTI masking through a reverse process of the RNTI masking unit 412 described in FIG. 4. In this case, the RNTI masking removal unit 531 of the receiving node may remove the masking by using a C-RNTI received from a serving cell or an RNTI for a specific purpose. The masking removal unit 531 may output data from which masking has been removed.

The data from which masking has been removed may be input to the CRC check and removal unit 532. The CRC check and removal unit 532 may check a CRC, and if there is no error as a result of the CRC check, it may obtain the DCI transmitted through the control channel. Therefore, the CRC check and removal unit 532 may output DCI from which the CRC is removed if there is no error as a result of the CRC check. On the other hand, if an error exists as a result of the CRC check, the received data may be discarded. Since the error cannot be corrected using the CRC and the receiving node has already removed the RNTI masking using its own RNTI, data with the CRC error may mean data not targeted for the terminal or a case where a failure occurs in the decoding even if it is targeted for the terminal.

The number of payload bits in DCI is up to 140 bits in case of the NR system, and is designed to use up to 512 bits. Therefore, the transmitting node may transmit by appending a CRC of 24 bits to the DCI payload. Since the polar code encoder is applied to the channel coder 420, and in case of the polar code, the larger the size of a list decoding when decoding, the lower the error extraction ability provided by the CRC, a polar code having a sufficient size should be used. For example, a polar code decoder that decodes using 8 lists applies decoding values from path information, and as a result, the error extraction ability detected by the CRC is reduced by 3 bits, resulting in the same CRC capability as that of 21 CRC bits. For this reason, a CRC larger than the 16 CRC bits of the LTE system is used in the NR system.

In case of the NR system, to improve the performance of the polar code, some bits of CRC bits are masked with the RNTI after interleaving, and used as an input value to the polar code encoder 422.

Figure 6A:
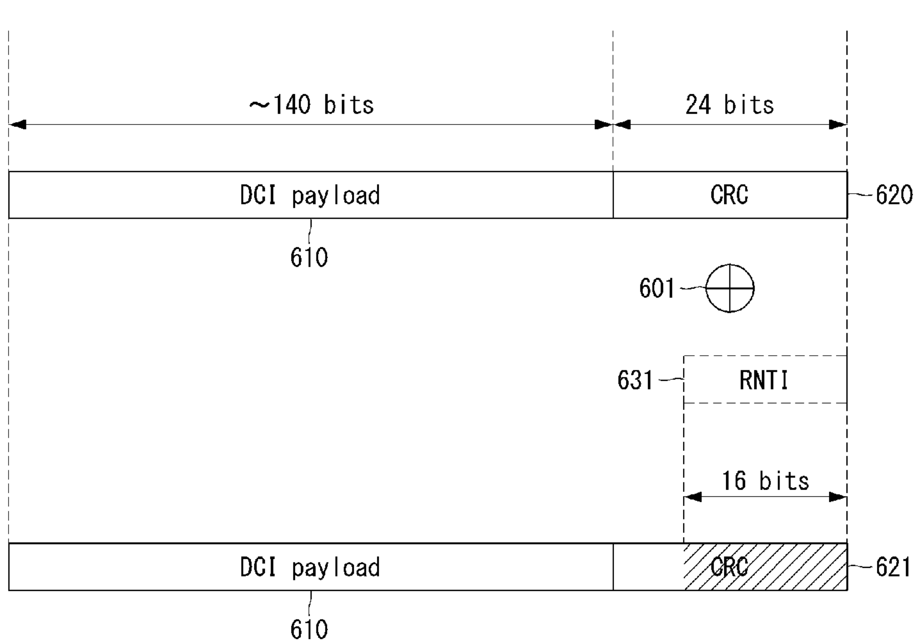
FIG. 6A is a conceptual diagram illustrating a case in which a CRC appended to DCI is masked with an RNTI according to a first exemplary embodiment of the present disclosure.

FIG. 6A is a conceptual diagram illustrating a case in which a portion of a CRC appended to DCI is masked with an RNTI in the NR system.

Referring to FIG. 6A, a CRC 620 may be appended to a DCI payload 610. As described above, the DCI payload 610 may have a size of 140 bits, and the CRC 620 may be generated in the manner described above based on the DCI payload 610. The CRC 620 generated as described above may have a size of 24 bits. Additionally, the scrambler 601 may use an RNTI 631 of 16 bits to scramble CRC bits of the CRC 620 through a masking process. Since the CRC 620 has a size of 24 bits and the RNTI 631 has a size of 16 bits, all bits of the CRC 620 cannot be masked with the RNTI 631. Therefore, in the NR system, when the CRC 620 is masked with the RNTI 631 by sequentially corresponding the RNTI 631 to the CRC 620, the masking is performed so that the last bit of the RNTI corresponds to the last bit of the CRC 620. Therefore, the RNTI 631 does not mask CRC bits corresponding to a difference between the number of RNTI bits and the number of bits of the CRC 620.

The RNTI masking unit 412 described in FIG. 4 operates as described above. That is, the output of the RNTI masking unit 412 may output the DCI payload 610 and the CRC 621 including a portion not masked with the RNTI and a portion masked with the RNTI.

If the length of bits of the DCI payload 610 is A, each bit of the DCI payload 610 may be expressed as Equation 2 below.

$$a_0, a_1, a_2, a_3, \ldots, a_{A-1} \quad \text{[Equation 2]}$$

In addition, if the length of parity bits, that is, the CRC 610, is L, each bit of the CRC 620 may be expressed as Equation 3 below.

$$p_0, p_1, p_2, p_3, \ldots, p_{L-1} \quad \text{[Equation 3]}$$

That is, if the length of bits of the DCI payload 610 is A and the length of the CRC 620, which is the length of the parity bits, is L, the total number K of bits transmitted on the control channel may be defined as Equation 4 below.

$$K = A + L \quad \text{[Equation 4]}$$

In case of the NR system, the CRC appended to the DCI may have a length of L=24, that is, the CRC 620 appended to the DCI payload 610 has a length of L=24, so the CRC addition unit 411 described in FIG. 4 may generate the CRC using a CRC generator polynomial of Equation 5.

$$g_{CRC24C}(D) = \left[D^{24} + D^{23} + D^{21} + D^{20} + D^{17} + D^{15} + D^{13} + D^{12} + D^{8} + D^{4} + D^{2} + D + 1\right] \quad \text{[Equation 5]}$$

The output after the CRC addition unit 411 generates the CRC based on Equation 5 may be in a form in which the DCI payload 610 and the CRC 620 illustrated in FIG. 6A are added.

When the output after the CRC addition unit 411 appends the CRC 620 to the DCI payload 610 is denoted as $b_k$ (k=0, 1, 2, 3, . . . , K−1), the DCI to which the CRC 620 is appended, that is, the input value to the RNTI masking unit 412, may be expressed as Equation 6 below.

$$b_k = a_k \text{ for } k = 0, 1, 2, \ldots, A-1$$
$$b_k = p_{k-a} \text{ for } k = A, A+1, A+2, \ldots, A+L-1 \quad \text{[Equation 6]}$$

The information input to the RNTI masking unit 412 may be scrambled so as to be masked with the RNTI as shown in Equation 7 below.

$$x_{rnti,0}, x_{rnti,1}, \ldots, x_{rnti,15} \quad \text{[Equation 7]}$$

In case of the NR system, the length of the CRC 620 is larger than the length of the RNTI for error extraction ability. Accordingly, the RNTI masking unit 412 may mask the lower-order bits of the CRC 620 according to the length of the RNTI. In case of the NR system, since the length of the CRC 620 is 24 bits and the length of the RNTI is 16 bits, the RNTI masking unit 412 may not mask the higher-order bits of the CRC as shown in Equation 8 below, and mask the lower-order bits of the CRC with the RNTI and output the masked CRC.

$$c_k = b_k \text{ for } k = 0, 1, 2, \ldots, A+7 \quad \text{[Equation 8]}$$
$$c_k = (b_k + x_{rnti,k-A-8}) \bmod 2 \text{ for } k = A+8, A+9, A+10, \ldots, A+23$$

Looking at Equation 8, it can be seen that the RNTI masking unit 412 outputs information bits that are not masked with the RNTI as they are, which correspond to the 0-th bit to the (A+7)-th bit in the CRC 620. In addition, it can be seen that the RNTI masking unit 412 scrambles the respective bits of the CRC 620 from the (A+8)-th bit to the last bit of the CRC 620 with the corresponding bits of the RNTI. Therefore, the output of the RNTI masking unit 412 may be CRC bits that are not masked with the RNTI and CRC bits that are masked with the RNTI. As described above, the CRC 621 output from the RNTI masking unit 412 may be appended to the DCI payload 610. That is, the input to the channel coder 420 may be the DCI payload 610 and the CRC 621 processed by the RNTI masking unit 412.

The bits masked with the RNTI and output by the RNTI masking unit 412 may be exemplified as shown in Equation 9 below.

$$c_0, c_1, c_2, c_3, \ldots, c_{K-1} \quad \text{[Equation 9]}$$

The output from the RNTI masking unit 412 may be channel-coded and rate-matched as previously described in FIG. 4. Additionally, although not specifically described in FIG. 4, control channel information may be transmitted through a scrambling and modulation process after rate matching, as being mapped to a physical control channel. When checking the CRC for a received control channel, the receiving node that has received the control channel transmitted by the transmitting node may use the RNTI assigned to it to check whether the data transmitted on the control channel has been transmitted to itself and whether there is a CRC error.

As described several times before, information on the transmitted DCI format and control channel allocation resource size, that is, information on the aggregation level are not provided to the receiving node. Therefore, the receiving node needs to attempt to perform decoding for combinations of several possible DCI formats and aggregation levels during blind decoding. Considering the complexity of the receiving node, the number of blind decoding attempts is limited to 44/36/22/20 for each of 15/30/60/120 KHz SCSs in the NR system.

As described above, in the NR system, there is a limit to the number of blind decoding attempts performed at the receiving node, so when decoding is attempted simultaneously for DCI formats of different sizes, the number of decoding attempts is consumed in proportion to the number of DCI formats. Therefore, when designing the system, the number of transmission candidate resource locations for each aggregation level should be determined considering the total number of decoding attempts. As a result, this may act as a factor limiting the number of transmission candidate resource locations, that is, a factor reducing the number of transmission candidate resource locations. The reduction in the number of transmittable candidate resource locations leads to reduced scheduling flexibility. The NR system is also configured to have the same size according to the DCI format to facilitate scheduling by minimizing the number of simultaneous decoding attempts according to the DCI size.

The following methods may be used to identify the DCI format during the decoding process to extract the DCI payload from the control channel. First, there may be a method of performing decoding by varying the DCI size of the DCI format and applying the number of transmission bits in the channel decoder 520. Second, there may be a method of generating a CRC and then applying an identifier for each purpose. Third, there may be a method of placing a DCI format identifier when using the DCI formats having the same size.

If the DCI format sizes are set differently, the number of blind decoding attempts may increase. Therefore, the present disclosure proposes a method for distinguishing a DCI format from DCI formats of the same size. In particular, in the present disclosure, a method and an apparatus for distinguishing multiple DCI formats by applying the same RNTI rather than applying specific purpose identifiers, such as SI-RNTI, P-RNTI, RA-RNTI, TPC-RNTI, etc.

For the NR system, various techniques for configuring a base station have been currently proposed, and in particular, techniques for expanding the system by configuring the backhaul of the base station as wireless links have been proposed. In this case, DCI formats that should be distinguishable depending on the expansion of the system, various scenarios, and/or various conditions may occur. There may be cases where more DCI formats are needed than the DCI formats defined in the current NR standard. Therefore, the present disclosure proposes methods for configuring various DCI formats based on a C-RNTI that is an identifier of the terminal. Additionally, the present disclosure proposes a method and an apparatus for distinguishing a DCI format without an indicator by using a CRC generation structure.

FIG. 6A above described the case in which the CRC appended to the DCI is masked with the RNTI in the NR system. The present disclosure proposes a method of masking the CRC appended to the DCI with the RNTI with reference to FIGS. 6A to 6D.

Figure 6B:
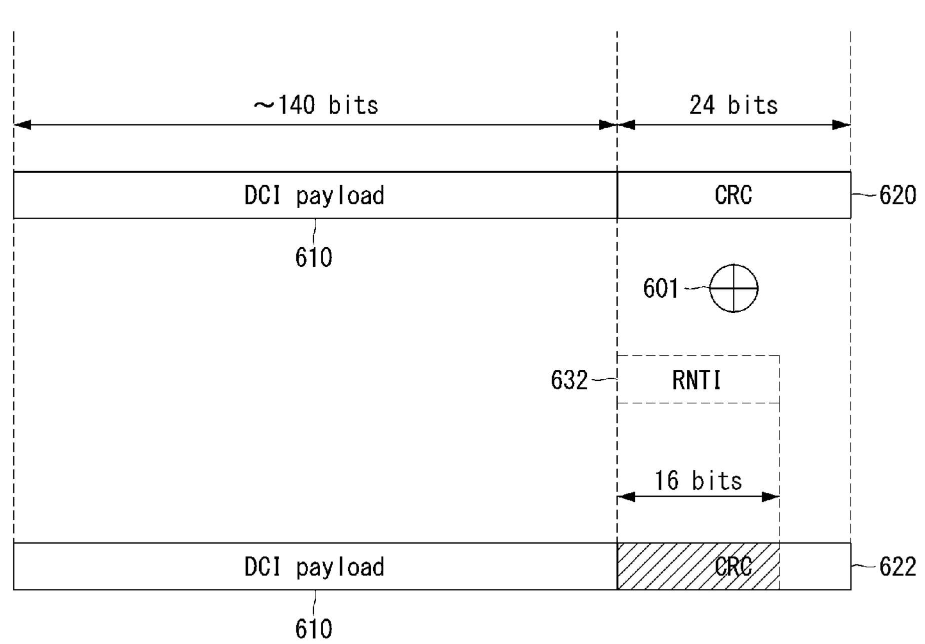
FIG. 6B is a conceptual diagram illustrating a case in which a CRC appended to DCI is masked with an RNTI according to a second exemplary embodiment of the present disclosure.
Figure 6C:
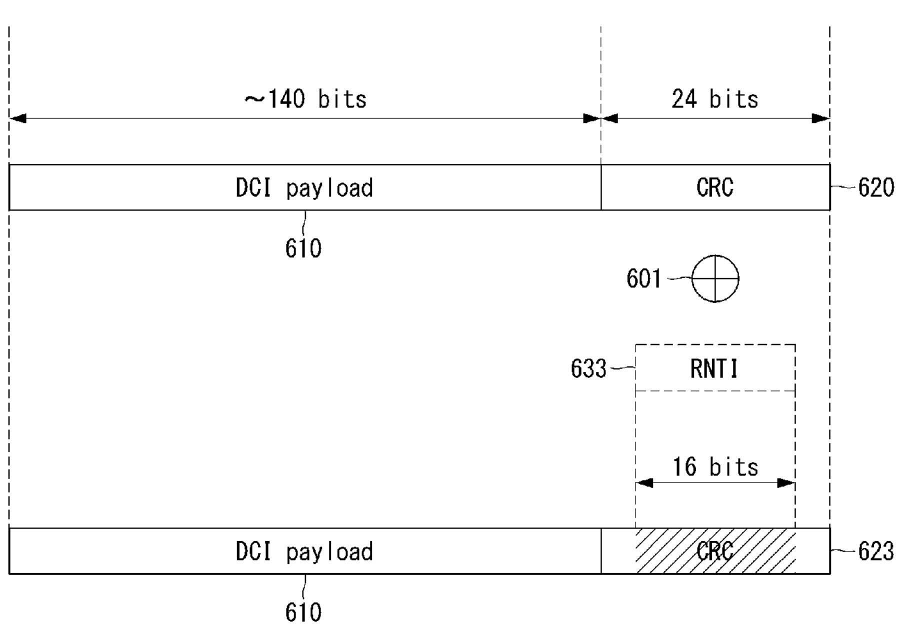
FIG. 6C is a conceptual diagram illustrating a case in which a CRC appended to DCI is masked with an RNTI according to a third exemplary embodiment of the present disclosure.
Figure 6D:
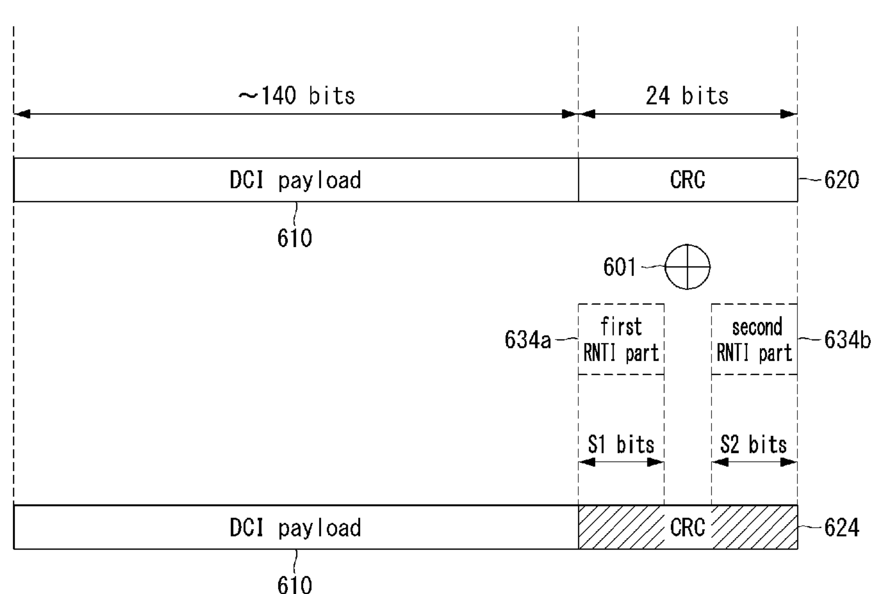
FIG. 6D is a conceptual diagram illustrating a case in which a CRC appended to DCI is masked with an RNTI according to a fourth exemplary embodiment of the present disclosure.

FIG. 6A is a conceptual diagram illustrating a case in which a CRC appended to DCI is masked with an RNTI according to a first exemplary embodiment of the present disclosure, FIG. 6B is a conceptual diagram illustrating a case in which a CRC appended to DCI is masked with an RNTI according to a second exemplary embodiment of the present disclosure, FIG. 6C is a conceptual diagram illustrating a case in which a CRC appended to DCI is masked with an RNTI according to a third exemplary embodiment of the present disclosure, and FIG. 6D is a conceptual diagram illustrating a case in which a CRC appended to DCI is masked with an RNTI according to a fourth exemplary embodiment of the present disclosure.

Hereinafter, a method for masking a CRC appended to DCI and a method for identifying a DCI format using the masking method will be described with reference to FIGS. 6A to 6D.

The operation illustrated in FIG. 6A may be the operation of the RNTI masking unit 412 that receives the input from the CRC addition unit 411, as described above. Since the length of the CRC 620 is longer than the length of the RNTI 631, some bits of the CRC 620 are not masked with the RNTI 631. In case of FIG. 6A, the RNTI masking unit 412 sequentially outputs CRC bits corresponding to a difference between the length of the RNTI 631 and the length of the CRC 620 from the input CRC 620 as they are. The RNTI masking unit 412 may respectively map consecutive bits of the RNTI 631 to consecutive CRC bits following the CRC bits not masked with the RNTI, and mask the consecutive CRC bits with the consecutive bits of the RNTI 631.

Looking at this again using Equations described above, the DCI to which the CRC is appended may be the same as previously described in Equation 6, the masking may be performed based on the RNTI described in Equation 7, and a result of the operation of the RNTI masking unit 412 may be the last 16 bits of the CRC bits, as described in Equation 7. In the following description, the form in which the CRC and RNTI 631 are mapped as shown in FIG. 6A will be defined as 'first format' or 'format A'.

Before referring to FIG. 6B, it may be assumed that the length of the CRC is 24 bits, the length of the RNTI is 16 bits, and the length of the CRC is longer than the length of the RNTI, as described in FIG. 6A. The configuration in FIG. 6B may be a form in which the first bit to the 16-th bit of the CRC are scrambled by being corresponded to the first bit to the 16-th bit of the RNTI 632. That is, the RNTI 632 in FIG. 6B has the same RNTI value as the RNTI 631 in FIG. 6A, but the position at which the RNTI 632 is mapped to the CRC 620 is different from that of the RNTI 631. Therefore, reference numbers for the RNTIs in FIGS. 6A and 6B are distinguished as 631 and 632, respectively, to indicate that the positions at which they are mapped to the CRC are different. In the following description, the form in which the CRC and RNTI 632 are mapped as shown in FIG. 6B will be defined as 'second format' or 'format B'.

FIG. 6C illustrates a form in which an RNTI 633 is mapped from a middle part of the 24-bit CRC 620 appended to the DCI payload 610. Referring to the form illustrated in FIG. 6C, a case in which CRC bits spaced apart by an arbitrary value from a start position of the CRC 620 are scrambled with the RNTI 633 is illustrated. Therefore, as illustrated in FIG. 6C, the CRC bits scrambled with the RNTI 633 may be located at a position spaced apart from the CRC bit by a predetermined value. In the following description, the form in which the CRC and RNTI 633 are mapped as shown in FIG. 6C will be defined as 'third format' or 'format C'.

Referring to FIG. 6D, it can be seen that the RNTI is divided into a first RNTI part 634*a* and a second RNTI part 634*b*. That is, the 16-bit RNTI may be divided into the first RNTI part 634*a* and the second RNTI part 634*b*. The first RNTI part 634*a* may have a size of S1 bits, the second RNTI part 634*b* may have a size of S2 bits, and a sum of S1 and S2 may indicate the total bits of the RNTI. That is, according to the above example, the sum of S1 and S2 may be 16.

The first RNTI part 634*a* may be used to arrange from the front part of the CRC 620 as shown in the second format (or format B) previously described in FIG. 6B, and the second RNTI part 634*b* may be arranged to match the last bit of the CRC 620 as shown in the first format (or format A). In the following description, the form in which the first RNTI part 634*a* and the second RNTI part 634*b* are mapped to the CRC as shown in FIG. 6D will be defined as 'fourth format' or 'format D'.

Methods for distinguishing DCI formats according to the present disclosure will be described with reference to FIGS. 6A to 6D described above.

That is, as a method of distinguishing and supporting DCI formats of the same size, scrambling is performed for the CRC 620 appended after the DCI payload 610 by using the RNTI assigned to the receiving node to identify the receiving node. Therefore, in the present disclosure, when transmitting the CRC by masking it with the RNTI assigned to the receiving node, the DCI format may be distinguished using a change in the position where the CRC is masked with the RNTI.

According to the present disclosure, the receiving node can distinguish the type of DCI format according to the masking position of the RNTI when checking a final result value of the CRC of the received control channel using the same RNTI in the process of receiving the control channel.

As described above, a case where the length of the CRC is longer than the length of the RNTI, and the position for scrambling the CRC with the RNTI is configured as shown in FIGS. 6A to 6C may be understood as follows. Since the length of the CRC is longer than the length of the RNTI, a space for information corresponding to the difference between the length L of the CRC and the length R of the RNTI may be utilized. In the present disclosure, a masking offset may be set to change the position where the CRC 620 and the RNTI are mapped. A range of the masking offset may be equal to or smaller than the difference between the length L of the CRC and the length R of the RNTI. Accordingly, when the length of the CRC is 24 bits and the length of the RNTI is 16 bits, the range of the masking offset may be from 0 to 8. The interpretation of the masking offset may vary depending on a scheme promised in advance. Hereinafter, a method of interpreting the masking offset according to a promise scheme will be described.

[First Exemplary Embodiment of a Masking Offset Interpretation Method]

It may be determined from which position of the CRC bits are masked with the RNTI (i.e. making offset may be determined). For example, when the masking offset is 8, 16 bits from the 9-th bit to the 24-th bit of the CRC may be masked with the 16-bit RNTI. This case may correspond to the format A previously described in FIG. 6A. In addition, when the masking offset is 0, 6 bits from the first bit to the 16-th bit of the CRC may be masked with the 16-bit RNTI. This case may correspond to the format B previously described in FIG. 6B. When the masking offset has a value of 1 to 7, 16 bits starting from one bit between the second and seventh bits of the CRC may be masked with the RNTI. This case may correspond to the format C previously described in FIG. 6C.

[Second Exemplary Embodiment of a Masking Offset Interpretation Method]

In the NR system, a masking offset may be applied by default. If this is called a default offset, the difference between the length L of the CRC bits and the length R of the RNTI bits may correspond to the default offset. That is, (L−R) CRC bits from the first bit of the CRC are not masked with the RNTI. Therefore, bits of the CRC, which correspond to the lowest index to the (L−R+1)-th index, are masked with the RNTI. In the following description, in order to distinguish the default offset from the masking offset according to the present disclosure, the offset indicating the position of CRC bits that are not masked with the RNTI or the position of CRC bits that are masked with the RNTI, according to the NR scheme, will be described as 'default offset'.

Here, a case where the masking offset is 0 may be interpreted as a case where only the default offset is applied. That is, the case where the masking offset is 0 may be interpreted as the format A (or first format) described in FIG. 6A.

In addition, when the masking offset is 16 (i.e. identical to R), since the default offset is 8, a sum of them may be equal to the length (i.e. 24) of the CRC. In this case, a modulo operation may be performed thereon by the length (i.e. 24) of the CRC, and it may be interpreted as masking with the RNTI starting from the bit corresponding to the first index of the CRC, as described in FIG. 6B. That is, the case where the masking offset has the value of R (e.g. 16), which is the length of the RNTI, may be interpreted as the format B (or second format) described in FIG. 6B.

When the masking offset is greater than 16, which is the length of the RNTI, since the default offset is 8, CRC bits with subsequent indices, not the bits from the first index, may be masked with the RNTI. In this case, as described in FIG. 6C, 16 consecutive CRC bits from the middle of the CRC may be masked with the RNTI.

Hereinafter, two methods for interpreting the masking offset for the case of FIG. 6D will be described with reference to FIGS. 7A and 7B.

Figure 7A:
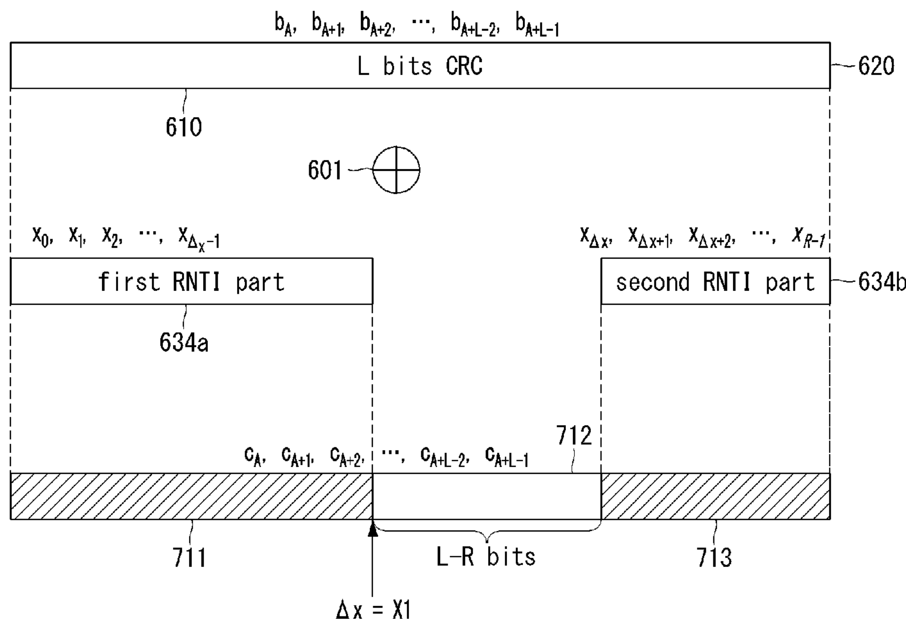
FIG. 7A is an exemplary diagram illustrating application of a masking offset when masking CRC bits with RNTI bits according to an exemplary embodiment of the present disclosure.
Figure 7B:
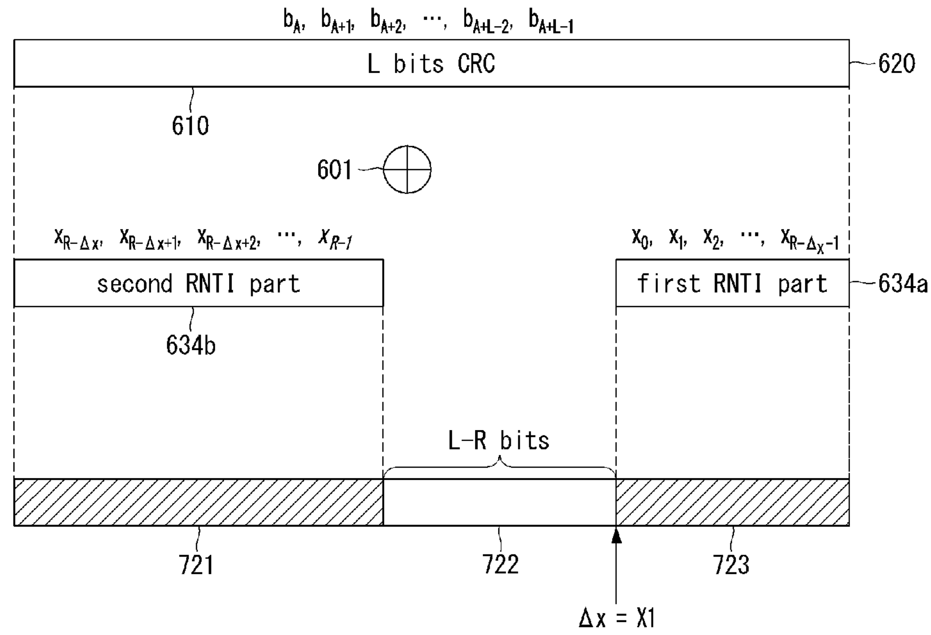
FIG. 7B is an exemplary diagram illustrating application of a masking offset when masking CRC bits with RNTI bits according to another exemplary embodiment of the present disclosure.

FIG. 7A is an exemplary diagram illustrating application of a masking offset when masking CRC bits with RNTI bits according to an exemplary embodiment of the present disclosure, and FIG. 7B is an exemplary diagram illustrating application of a masking offset when masking CRC bits with RNTI bits according to another exemplary embodiment of the present disclosure.

Before referring to FIG. 7A, it should be noted that the same reference numbers are used for the same parts as those described in FIG. 6D. For the CRC 620 of L bits, the RNTI of R bits may be divided into the first RNTI part 634*a* and the second RNTI part 634*b*, and a masking offset for a case where the CRC 620 is masked with bits of the respective divided parts is assumed as $\Delta_x$. The masking offset $\Delta_x$ may indicate the first bit of consecutive CRC bits not masked with the RNTI among the CRC bits. Therefore, when the number of RNTI bits is 16 and the masking offset indicates 9, each of the first RNTI part 634*a* and the second RNTI part 634*b* may be a part having 8 bits (i.e. ½ of the entire RNTI). However, when the masking offset is greater than 9 and less than 15, the first RNTI part 634*a* may have a longer length than the second RNTI part 634*b*. Conversely, when the masking offset is greater than 1 and less than 9, the second RNTI part 634*b* may have a longer length than the first RNTI part 634*a*. That is, the case illustrated in FIG. 7A is an example where the first RNTI part 634*a* has a longer length than the second RNTI part 634*b*.

Therefore, the final output CRC may include a CRC part 711 obtained by masking CRC bits corresponding to the first RNTI part 634*a* with first RNTI part 634*a*, a CRC part 712 not masked with the RNTI, and a CRC part 713 obtained by masking CRC bits corresponding to the second RNTI part 634*b* with the second RNTI part 634*b*.

Alternatively, masking may be performed starting from the lowest index of the CRC, and the masking offset may specify the position where the masking ends. For the CRC 620 of L bits, the RNTI of 16 bits may be divided into the first RNTI part 634*a* and the second RNTI part 634*b* based on the position where the masking ends (i.e. the position of the CRC bits not masked). Assuming that the masking offset when masking the CRC 620 using the respective divided RNTI parts is $\Delta_x$, since the RNTI starts to be mapped from the index 0, the first RNTI part 634*a* may be mapped up to a position corresponding to an index 1 less than the masking offset. Accordingly, CRC bits corresponding to the first RNTI part 634*a* may be scrambled as being masked with the first RNTI part 634*a*. Additionally, the transmitting node and the receiving node know both L (i.e. length of the CRC) and R (i.e. length of the RNTI). Therefore, they know that (L−R) CRC bits after the CRC bits masked with the first RNTI part 634*a* are CRC bits not masked with the RNTI. The remaining CRC bits may be scrambled by being masked with the second RNTI part 634*b*.

Although the two schemes described above are expressed differently, they may result in the same form. That is, the masking offset 4*x* may indicate the first bit of consecutive CRC bits that are not masked among the CRC bits, or may be a value that specifies the end position where partial masking is performed starting from the lowest index of the CRC.

Therefore, when the number of RNTI bits is 16 and the masking offset indicates 9, each the first RNTI part 634*a* and the second RNTI part 634*b* may have 8 bits (i.e. ½ of the entire RNTI). However, when the masking offset is greater than 9 and less than 15, the first RNTI part 634*a* may have a longer length than the second RNTI part 634*b*. Conversely, when the masking offset value is greater than 1 and less than 9, the second RNTI part 634*b* may have a longer length than the first RNTI part 634*a*. That is, the case illustrated in FIG. 7A illustrates an example where the first RNTI part 634*a* has a longer length than the second RNTI part 634*b*.

To summary what was described above, the masking offset $\Delta_x$ may indicate the position of CRC bits not masked with the RNTI with respect to the first bit of the CRC. The consecutive CRC bits as shown in Equation 10 below are not masked with the RNTI.

$$k = A + \Delta_x, A + \Delta_x + 1, \ldots, A + \Delta_x + L - R - 1 \quad \text{[Equation 10]}$$

When $x_{rnti,i(k)}$ expresses RNTI bits, the CRC may be scrambled with the respective RNTI bits from the lowest index of the CRC, and the result of scrambling the CRC may be expressed in Equation 11 below.

$$c_k = b_k \text{ for } k = 0, 1, 2, \ldots, A - 1 \quad \text{[Equation 11]}$$

$$c_{k+\Delta_k} = b_{k+\Delta_k} \text{ for } k = A, A+1, A+2, \ldots, A+L-R-1$$

-continued $$c_{i(k)} = (b_{i(k)} + x_{rnti,n(k)})\text{mod}2 \text{ for } k = A + L - R, A + L - R + 1, \ldots, A + L - 1$$

$$i(k) = A + (k + \Delta_x - A)\text{mod}L,\ n(k) = (k + \Delta_x - (A + L - R))\text{mod}R$$

Referring to FIG. 7B, another exemplary embodiment where the masking offset divides the RNTI into the first RNTI part 634*a* and the second RNTI part 634*b* is illustrated. In this case, the masking offset value needs to be set so that the RNTI is be divided. This will be described with reference to FIG. 7B as follows.

As previously described, the default offset may have been already set. When the size (length) of the CRC is L and the size (length) of the RNTI is R, CRC bits spaced apart by (L–R) bits from the lowest index may be masked with the RNTI. Therefore, the default offset in the NR system may be regarded as being set to L-R. Accordingly, a masking offset according to the present disclosure may be additionally used. In the NR system where the length of the CRC is 24 bits and the length of the RNTI is 16 bits, the default offset may be 8 as described above. Therefore, the masking offset according to the present disclosure may be set to a value of 1 or more. When the masking offset is determined in the above-described manner, specific CRC bits determined based on the default offset and the masking offset may be masked with the RNTI. In this case, as illustrated in FIG. 7B, the first RNTI part 634*a* may mask the corresponding CRC starting from the low index of the RNTI. When the masking offset has a value of 1 or more, RNTI bits that do not mask the CRC may occur among RNTI bits.

That is, RNTI bits that mask from the position of the CRC bits based on the default offset and the masking offset may be the first RNTI part 634, starting from the lowest index of the RNTI. The remaining RNTI bits, that is, the second RNTI part 634*b*, may sequentially mask the CRC bits starting the lowest index among the CRC bits, starting the lowest index of the second RNTI part 634*b*. To describe this again, this case may be a case where RNTI bits sequentially mask from lower order based on the position of the CRC where masking starts based on the masking offset. When $x_{rnti,i(k)}$ expresses RNTI bits, when scrambling is performed using the respective RNTI bits as masking information in order from the low index of the CRC 620 based on the masking offset, the result of scrambling the CRC may be output as shown in Equation 12 below.

[Equation 12]

$$c_k = b_k \text{ for } k = 0, 1, 2, \ldots, A - 1$$

$$c_{k+\Delta_k} = b_{k+\Delta_k} \text{ for } k = A, A + 1, A + 2, \ldots, A + L - R - 1$$

$$c_{i(k)} = (b_{i(k)} + x_{rnti,k-(A+L-R)})\text{mod}2 \text{ for } k = A + L - R, A + L - R + 1, \ldots, A + L - 1$$

$$i(k) = A + (k + \Delta_x - A)\text{mod}L$$

Since the methods described above are methods for masking the CRC 620 appended to the DCI, the same or different CRC masking methods may be used for the respective UEs. Therefore, more DCI formats can be identified when DCI formats with the same length are defined based on the CRC masking scheme. In addition, in the method of identifying the DCI format according to the CRC masking scheme, the masking offset may be a value already defined through a protocol between the transmitting node (e.g. base station or CU) and the receiving node (e.g. UE, DU, or RU).

According to the method of FIGS. 6A to 6C described above, the scrambling positions of the RNTI bits may be determined based on the default offset and the masking offset, and the order of the RNTI bits is maintained as it is.

In addition, even in the case of the method described in FIG. 7A, it can be seen that the order of the RNTI bits remains the same, except that the RNTI is divided based on the start position of the CRC bits not masked with the RNTI or the position where the masking with the RNTI ends.

In addition, the case illustrated in FIG. 7B is the same as the cases of FIGS. 6A to 6C in that the scrambling position is determined according to the default offset and the masking offset, but it can be seen that the order of RNTI bits is partially changed in that the second RNTI part 634*b* masks CRC bits from the lowest index of the CRC bits.

According to the methods described above, DCI formats, which are distinguishable by the masking offset, may be defined in various ways in proportion to the size of the CRC. For example, when the CRC of 24 bits is used, the DCI formats and the masking offsets may be matched as shown in Table 4 and Table 5 below. In the present disclosure described below, these DCI formats will be referred to as 'DCI masking formats'.

TABLE 4

| DCI masking format | Masking offset $\Delta_x$ |
|---|---|
| A-0 | 0 |
| A-1 | 1 |
| A-2 | 2 |
| A-3 | 3 |
| A-4 | 4 |
| A-5 | 5 |
| A-6 | 6 |
| A-7 | 7 |
| A-8 | 8 |
| A-9 | 9 |
| A-10 | 10 |
| A-11 | 11 |
| A-12 | 12 |

TABLE 5

| DCI masking format | Masking offset $\Delta_x$ |
|---|---|
| A-13 | 13 |
| A-14 | 14 |
| A-15 | 15 |
| A-16 | 16 |
| A-17 | 17 |
| A-18 | 18 |
| A-19 | 19 |
| A-20 | 20 |
| A-21 | 21 |
| A-22 | 22 |
| A-23 | 23 |

Table 4 and Table 5 show forms in which the DCI formats are classified using the masking offsets according to the present disclosure when the length of CRC is 24 bits and the length of RNTI is 16 bits. They are illustrated as being divided into different tables since it is difficult to exemplify them in one table due to lack of space.

As described above, the position where the CRC and the RNTI are scrambled for masking may be defined by the masking offset, and the DCI format may be identified in one of the methods described above. Additionally, according to another exemplary embodiment of the present disclosure, the CRC bits masked with the RNTI may be indicated by a bitmap form as illustrated in Tables 6 to 8 below.

TABLE 6

| DCI masking format | x(0), x(1), . . . , x(23 | | | | | | | | | | | | | | | | | | | | | | |
|---|---|---|---|---|---|---|---|---|---|---|---|---|---|---|---|---|---|---|---|---|---|---|---|
| A-0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| A-1 | 1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 |
| A-2 | 1 | 1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 |
| A-3 | 1 | 1 | 1 | 0 | 0 | 0 | 0 | 0 | 0 | 0 | 0 | 1 | 1 | 1 | 1 | 1 | 1 | 1 | 1 | 1 | 1 | 1 | 1 | 1 |
| A-4 | 1 | 1 | 1 | 1 | 0 | 0 | 0 | 0 | 0 | 0 | 0 | 0 | 1 | 1 | 1 | 1 | 1 | 1 | 1 | 1 | 1 | 1 | 1 | 1 |
| A-5 | 1 | 1 | 1 | 1 | 1 | 0 | 0 | 0 | 0 | 0 | 0 | 0 | 0 | 1 | 1 | 1 | 1 | 1 | 1 | 1 | 1 | 1 | 1 | 1 |
| A-6 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 1 | 1 |
| A-7 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 1 |
| A-8 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| A-9 | 1 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 |
| A-10 | 1 | 1 | 1 | 1 | 1 | 1 | 1 | 1 | 1 | 1 | 0 | 0 | 0 | 0 | 0 | 0 | 0 | 0 | 1 | 1 | 1 | 1 | 1 | 1 |

TABLE 7

| DCI masking format | x(0), x(1), . . . , x(23 | | | | | | | | | | | | | | | | | | | | | | |
|---|---|---|---|---|---|---|---|---|---|---|---|---|---|---|---|---|---|---|---|---|---|---|---|
| A-11 | 1 | 1 | 1 | 1 | 1 | 1 | 1 | 1 | 1 | 1 | 1 | 0 | 0 | 0 | 0 | 0 | 0 | 0 | 0 | 1 | 1 | 1 | 1 | 1 |
| A-12 | 1 | 1 | 1 | 1 | 1 | 1 | 1 | 1 | 1 | 1 | 1 | 1 | 0 | 0 | 0 | 0 | 0 | 0 | 0 | 0 | | 1 | 1 | 1 |
| A-13 | 1 | 1 | 1 | 1 | 1 | 1 | 1 | 1 | 1 | 1 | 1 | 1 | 1 | 0 | 0 | 0 | 0 | 0 | 0 | 0 | 0 | 1 | 1 | 1 |
| A-14 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 1 | 1 |
| A-15 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 1 |
| A-16 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| A-17 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
| A-18 | 0 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 |
| A-19 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 | 0 |
| A-20 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 |
| A-21 | 0 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 |
| A-22 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 0 | 0 |
| A-23 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 0 |
| A-24 | 0 | 0 | 0 | 0 | 1 | 1 | 1 | 1 | 1 | 1 | 1 | 1 | 0 | 0 | 0 | 0 | 1 | 1 | 1 | 1 | 1 | 1 | 1 | 1 |
| A-25 | 1 | 0 | 0 | 0 | 0 | 1 | 1 | 1 | 1 | 1 | 1 | 1 | 1 | 0 | 0 | 0 | 0 | 1 | 1 | 1 | 1 | 1 | 1 | 1 |
| A-26 | 1 | 1 | 0 | 0 | 0 | 0 | 1 | 1 | 1 | 1 | 1 | 1 | 1 | 1 | 0 | 0 | 0 | 0 | 1 | 1 | 1 | 1 | 1 | 1 |
| A-27 | 1 | 1 | 1 | 0 | 0 | 0 | 0 | 1 | 1 | 1 | 1 | 1 | 1 | 1 | 1 | 0 | 0 | 0 | 0 | 1 | 1 | 1 | 1 | 1 |

TABLE 8

| DCI masking format | x(0), x(1), . . . , x(23) | | | | | | | | | | | | | | | | | | | | | | |
|---|---|---|---|---|---|---|---|---|---|---|---|---|---|---|---|---|---|---|---|---|---|---|---|
| A-28 | 1 | 1 | 1 | 1 | 0 | 0 | 0 | 0 | 1 | 1 | 1 | 1 | 1 | 1 | 1 | 1 | 0 | 0 | 0 | 0 | 1 | 1 | 1 | 1 |
| A-29 | 1 | 1 | 1 | 1 | 1 | 0 | 0 | 0 | 0 | 1 | 1 | 1 | 1 | 1 | 1 | 1 | 1 | 0 | 0 | 0 | 0 | 1 | 1 | 1 |
| A-30 | 1 | 1 | 1 | 1 | 1 | 1 | 0 | 0 | 0 | 0 | 1 | 1 | 1 | 1 | 1 | 1 | 1 | 1 | 0 | 0 | 0 | 0 | 1 | 1 |
| A-31 | 1 | 1 | 1 | 1 | 1 | 1 | 1 | 0 | 0 | 0 | 0 | 1 | 1 | 1 | 1 | 1 | 1 | 1 | 1 | 0 | 0 | 0 | 0 | 1 |
| . . . | | | | | | | | | | | | . . . | | | | | | | | | | | | |
| A-xx | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 |

In the example of Table 6 to Table 8, RNTI masking information may be expressed using bitmap information. The position where masking with the corresponding RNTI bits is performed is denoted as '1', and the number of '1' in the bitmap information may be determined according to the size of the RNTI.

Therefore, when using the bitmap as shown in Table 6 to Table 8, classification of more types of DCI formats becomes possible by expressing cases where masking is performed on non-consecutive CRC bits, compared to the scheme of using the masking offset.

When using the bitmaps of Table 6 to Table 8 described above, the masking position may be determined as shown in Table 9 below.

TABLE 9

$c_k = b_k$ for $k = 0, 1, 2, \ldots, A - 1$
$n = 0;$
for $k = A$ to $A + L - 1$
if $x(k - A) == 0$
$c_k = b_k;$
else
$c_k = (b_k + x_{rnti,\ n}) \bmod 2;$
$n = n + 1;$
end if
end for Meanwhile, the receiving node may identify a DCI format and obtain the corresponding control information through a CRC check process using the DCI and RNTI during a control information decoding process. In particular, when using the method described above according to the present disclosure, the receiving node may distinguish various DCI formats without a special identifier.

In order to obtain the DCI transmitted from the transmitting node, the receiving UE or the DU or RU constituting a part of the base station may perform blind decoding on control channel resources based on default information configured through system information, and identify a DCI format by using the RNTI after performing decoding at positions of transmission candidate resources according to a CCE aggregation level. Accordingly, more transmission candidate resources can be secured.

As in the current NR system, when DCI formats of the same size are distinguished by format identifiers, resources for the format identifier are required, and when DCI formats are distinguished by different types of RNTIs, the types of RNTIs should be subdivided. However, according to the present disclosure, each DCI format may be distinguished as shown in Table 10 and Table 11 below by varying a DCI masking format, so DCI formats can be distinguished without increasing the number of decoding attempts for the same DCI size. When using the DCI masking formats as shown in Table 10 and Table 11 below for DCI formats using the same RNTI in the NR system, the DCI formats using the same RNTI can have the same DCI size.

TABLE 10

| DCI format | Usage | RNTI | DCI masking format |
|---|---|---|---|
| 0_0 | Scheduling of PUSCH in one cell | C-RNTI, CS-RNTI, MCS-C-RNTI, TC-RNTI | A-0 |
| 0_1 | Scheduling of one or multiple PUSCH in one cell, or indicating downlink feedback information for configured grant PUSCH (CG-DFI) | C-RNTI, CS-RNTI, SP-CSI-RNTI, MCS-C-RNTI | A-1 |
| 0_2 | Scheduling of PUSCH in one cell | C-RNTI, CS-RNTI, SP-CSI-RNTI, MCS-C-RNTI | A-2 |
| 1_0 | Scheduling of PDSCH in one cell | C-RNTI, CS-RNTI, MCS-C-RNTI, P-RNTI, SI-RNTI, RA-RNTI, MsgB-RNTI, TC-RNTI | A-8 |
| 1_1 | Scheduling of one or multiple PDSCH in one cell, and/or triggering one shot HARQ-ACK codebook feedback | C-RNTI, CS-RNTI, MCS-S-RNTI | A-9 |
| 1_2 | Scheduling of PDSCH in one cell | C-RNTI, CS-RNTI, MCS-C-RNTI | A-10 |
| 2_0 | Notifying a group of UEs of the slot format, available RB sets, COT duration and search space set group switching | SFI-RNTI | A-0 |
| 2_1 | Notifying a group of UEs of the PRB(s) and OFDM symbol(s) where UE may assume no transmission is intended for the UE | INT-RNTI | A-0 |
| 2_2 | Transmission of TPC commands for PUCCH and PUSCH | TPC-PUSCH-RNTI, TPC-PUCCH-RNTI | A-0 |
| 2_3 | Transmission of a group of TPC commands for SRS transmissions by one or more UEs | TPC-SRS-RNTI | A-0 |
| 2_4 | Notifying a group of UEs of the PRB(s) and OFDM symbol(s) where UE cancels the corresponding UL transmission from the UE | CI-RNTI | A-0 |

TABLE 11

| DCI format | Usage | RNTI | DCI masking format |
|---|---|---|---|
| 2_5 | Notifying the availability of soft resources | AI-RNTI | A-0 |
| 2_6 | Notifying the power saving information outside DRX Active Time for one or more UEs | PS-RNTI | A-0 |

TABLE 11-continued

| DCI format | Usage | RNTI | DCI masking format |
|---|---|---|---|
| 2_7 | Notifying paging early indication and TRS availability indication for one or more UEs. | PEI-RNTI | A-0 |
| 3_0 | Scheduling of NR sidelink in one cell | SL-RNTI, SL-CS-RNTI | A-0 |
| 3_1 | Scheduling of LTE sidelink in one cell | V-RNTI | A-0 |
| 4_0 | Scheduling of PDSCH with CRC scrambled by MCCH-RNTI/G-RNTI for broadcast | MCCH-RNTI, G-RNTI | A-16 |
| 4_1 | Scheduling of PDSCH with CRC scrambled by G-RNTI/G-CS-RNTI for multicast | G-RNTI, G-CS-RNTI | A-17 |
| 4_2 | Scheduling of PDSCH with CRC scrambled by G-RNTI/G-CS-RNTI for multicast | G-RNTI, G-CS-RNTI | A-18 |

Table 10 and <Table 11> correspond to Table 2 and Table 3 described above, and may additionally have DCI masking format values according to the present disclosure. The DCI masking format values exemplified in Table 10 and Table 11 may correspond to the DCI masking format values of Table 4 and Table 5 described above.

In the examples of Table 10 and Table 11 above, the DCI formats for PUSCH/PDSCH scheduling (i.e. DCI format 0_0, DCI format 0_1, DCI format 0_2, DCI format 1_0, DCI format 1_1, DCI format 1_2, DCI format 4_0, DCI format 4_1, and DCI format 4_2) may all have the same DCI size, and when transmitted using the same type of RNTI, they can be distinguished by the DCI masking formats according to the present disclosure without a separate identifier.

Describing this in detail according to Table 10 and Table 11, the DCI format 0_0 may use A-0 as a DCI masking format with a masking offset of 0, the DCI format 0_1 may use A-1 as a DCI masking format with a masking offset of 1, the DCI format 0_2 may use A-2 as a DCI masking format with a masking offset of 2, the DCI format 1_0 may use A-8 as a DCI masking format with a masking offset of 8, the DCI format 1_1 may use A-9 as a DCI masking format with a masking offset of 9, the DCI format 1_2 may use A-10 as a DCI masking format with a masking offset of 10, the DCI format 4_0 may use A-17 as a DCI masking format with a masking offset of 17, the DCI format 4_1 may use A-18 as a DCI masking format with a masking offset of 18, and the DCI format 4_2 may use A-19 as a DCI masking format with a masking offset of 19.

In addition, if additional information is needed in the existing DCI format, some of the information included in the DCI may be configured as representative values using the DCI masking formats as shown in Table 12 below.

TABLE 12

| DCI masking format | Redundancy version |
|---|---|
| A-0 | 00 |
| A-4 | 01 |
| A-5 | 10 |
| A-6 | 11 |

An example of using the above masking formats may be illustrated as shown in Table 13 below.

TABLE 13

| DCI format | Usage | RNTI | DCI masking format |
|---|---|---|---|
| 0_0 | Scheduling of PUSCH in one cell | C-RNTI, CS-RNTI, MCS-C-RNTI, TC-RNTI | A-0: RV “00”<br>A-4: RV “01”<br>A-5: RV “10”<br>A-6: RV “11” |

As shown in Table 13 above, the method of utilizing the DCI masking format to additionally represent some of the information in the DCI may be used in the following cases. For example, some of information of the DCI may be truncated to fit the size of each DCI format. In this case, if the truncated information is information on a redundancy version (RV) for PUSCH scheduling in the DCI format 0_0, information on scheduled data may be provided by changing the DCI masking format differently as shown in Table 13.

The receiving node, for example, the UE or the DU or RU constituting the base station mat obtain the RV value by checking the DCI masking format applied to the CRC transmitted along with the DCI. As shown in the example in Table 13, the DCI masking formats according to the present disclosure may be used not only to identify the DCI formats but also to transmit additional information.

When decoding, the receiving node goes through a rate matching process using the size of each DCI and information on the size (i.e. arrogation level) of the resources used to transmit control information, and this decoding process is counted as one decoding attempt. Since the payload size of each DCI format should be the same, the number of decoding attempts may not increase. In addition, control information can be transmitted in control channel resources that can be allocated for scheduling according to a combination of aggregation levels. However, the total number of decoding attempts is limited in consideration of hardware complexity, and this is reflected during scheduling to determine possible candidate resource locations.

The receiving node may attempt to decode the candidate PDCCHs within the search space by considering the set number of blind decoding attempts. The number of PDCCH candidates may be set for each search space for each aggregation level, and there is no fixed number of decoding attempts according to the aggregation level. The number of blind decoding attempts may be assigned to other aggregation levels, excluding aggregation levels that are not used in a scenario to which the receiving node belongs.

In case of a backhaul link using a wide bandwidth of an ultra-high frequency band, subcarrier spacings supported by the OFDM transmission scheme may be more diverse than those of the existing NR system, considering the frequency band characteristics. Additionally, DCI formats for control channels may be subdivided depending on the scenario and environment to be supported, and there may be many cases of DCI formats to consider at one time. In this case, when configuring information bits in the DCI format using the masking offset according to the present disclosure, CRC bits can be used to identify the DCI format and transmit some information. It is apparent to those skilled in the art that the above-described configuration can be used in communication systems for transmitting information on control channels and other channels other than the backhaul system.

Figure 8:
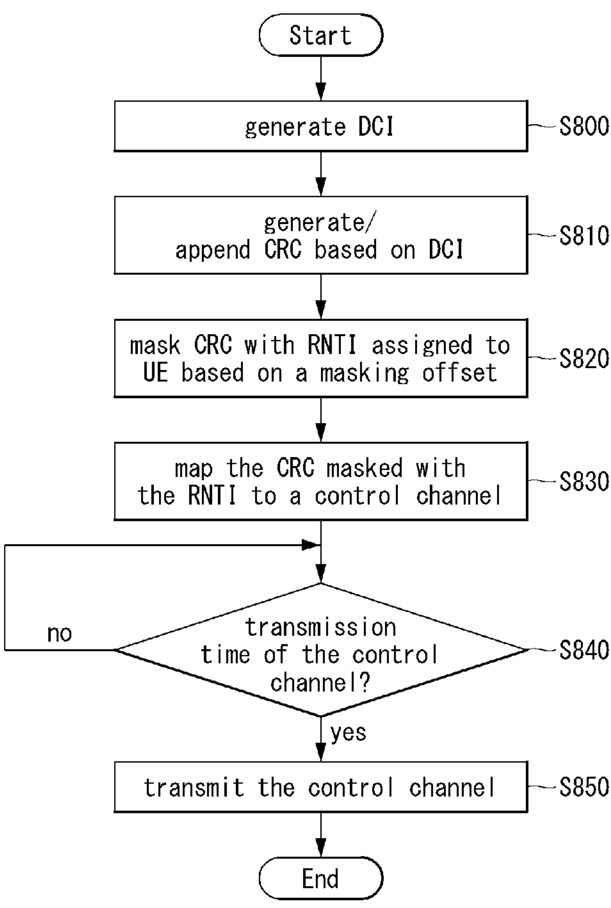
FIG. 8 is a control flow diagram when a transmitting node transmits a control channel according to the present disclosure.

FIG. 8 is a control flow diagram when a transmitting node transmits a control channel according to the present disclosure.

Before referring to FIG. 8, the transmitting node according to the present disclosure may be a base station or a CU and/or DU constituting the base station. Additionally, the transmitting node may include the configuration of the communication node 200 previously described in FIG. 2. Additionally, the transmitting node according to the present disclosure may include the configuration previously described in FIG. 4 within the transceiver 230 among the components of the communication node 200.

The transmitting node may generate DCI (S800). In this case, the DCI may be information generated based on the purpose as previously described in Table 2 and Table 3. The DCI may be generated by the processor 210 and provided to the transceiver 230.

The CRC addition unit 411 of the transmitting node may generate a CRC based on the DCI and attach (or append) the CRC to the DCI (S810). The CRC may be generated based on the number of bits of the DCI. For example, the CRC may be generated in the form of Equation 5 described above. Additionally, the CRC addition unit 411 may output the generated CRC by appending it to the end of the DCI.

The RNTI masking unit 412 of the transmitting node may mask the CRC with the RNTI assigned to the receiving node (e.g. UE) based on a masking offset (S820). This masking scheme may be performed based on the method described in FIGS. 6A to 6D and FIGS. 7A and 7B. Additionally, the masking offset may be provided by the processor 210 of the transmitting node to the RNTI masking unit 412. The RNTI masking unit 412 of the transmitting node masks the CRC based on the masking offset value, which is used to identify a format of the DCI or to additionally represent specific information of the DCI while identifying the DCI format, and provide the DCI and the CRC some bits of which are masked with the RNTI to the channel coder 420. Accordingly, the channel coder 420 of the transmitting node may perform channel coding on the DCI and the CRC, perform rate matching on the channel-coded data, and then perform scrambling and modulation processes thereon.

The transmitting node may map the DCI and the CRC scrambled according to the present disclosure to a control channel (S830). The transmitting node may check whether a transmission time of the control channel has arrived (S840). As a result of the check in the step S840, if the transmission time of the control channel has not arrived, the transmitting node may wait for the transmission time. If the transmission time of the control channel has arrived, the transmitting node may transmit the control channel (S850).

Since the operations of the transmitting node are illustrated in FIG. 8, and the detailed operations are described above, redundant description will be omitted. In addition, the operations of the receiving node corresponding to the operations of the transmitting node may be inferred from FIG. 8. In particular, based on the description of FIG. 5 and the method for identifying the DCI format using a masking offset and/or a default offset and a masking offset, the receiving node can identify the DCI format by removing the masking offset of the CRC. To describe this in more detail, the receiving node may receive a control channel and channel-decode the received control channel. Then, the receiving node may identify the position of CRC bits using the RNTI assigned to the receiving node from the channel-decoded information. Therefore, the receiving node may remove masking using possible masking offsets at the position of the identified CRC bits. For example, masking may be removed from the CRC bits using the masking offsets based on the DCI masking formats previously described in Table 4 and Table 5, or masking may be removed from the CRC bits using the masking offsets described in Table 6 to Table 8.

The CRC does not have error correction capability and is simply information that can identify whether an error exists in the received information. Therefore, the receiving node can perform CRC checks on control channel information from which masking is removed based on various masking offsets. If an error is not detected as a result of the CRC check, that is, if there is no error as a result of the CRC check, the masking offset used to remove the masking may be determined as the masking offset that has been used to transmit the corresponding control channel information. Once the masking offset is determined, a DCI format corresponding to the determined masking offset can be determined based on Table 4 and Table 5 or based on Table 6 to Table 8. As described above, the receiving node can identify the DCI format using the masking offset without transmission of special additional information. Additionally, if information added to the DCI is additionally transmitted using the masking offset of the CRC, for example, if the RV value described above or another value is promised in advance, additional information can be obtained by checking the masking offset.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A control channel transmission method of a transmitting node, comprising:

generating cyclic redundancy check (CRC) bits based on downlink control information (DCI) for transmission to a first receiving node;

appending the generated CRC bits to an end of the DCI bits;

masking n CRC bits among the generated CRC bits with bits of a radio network temporary identifier (RNTI), starting from a position indicated by a first masking offset, the bits of RNTI being assigned to identify the first receiving node, wherein n is an integer greater than or equal to 2 and less than a total number of the generated CRC bits; and transmitting the DCI including the masked CRC bits via a control channel to the first receiving node, wherein a DCI format used with the first masking offset is different from a DCI format used with a second masking offset.

2. The control channel transmission method according to claim 1, wherein the first masking offset further indicates additional control information not included in the DCI.

3. The control channel transmission method according to claim 1, wherein the masking the n CRC bits among the generated CRC bits with bits of the RNTI comprises:

determining a first start index of the generated CRC bits based on a default offset, the default offset indicating a default position for a CRC bit among the generated CRC bits arranged from a low index to a high index;

determining a second start index from the first start index based on the first masking offset; and masking the n CRC bits starting at the second start index among the generated CRC bits with the bits of RNTI.

4. The control channel transmission method according to claim 3, further comprising: when the second start index is greater than a last index of the CRC, determining the second start index according to a modulo operation on the second start index by a number of the CRC bits.

5. The control channel transmission method according to claim 3, wherein the masking the n CRC bits starting at the second start index with bits of the RNTI comprises: when a number of the CRC bits from the second start index to the last index is smaller than a number of bits of the RNTI, masking CRC bits starting from a lowest index among the generated CRC bits with remaining bits of the RNTI.

6. The control channel transmission method according to claim 1, wherein the first masking offset is represented in form of a bitmap.

7. A transmitting node comprising a processor, wherein the processor causes the transmitting node to perform:

generating cyclic redundancy check (CRC) bits based on downlink control information (DCI) for transmission to a first receiving node;

appending the generated CRC bits to an end of the DCI bits;

masking n CRC bits among the generated CRC bits with bits of a radio network temporary identifier (RNTI), starting from a position indicated by a first masking offset, the RNTI being assigned to identify the first receiving node, wherein n is an integer greater than or equal to 2 and less than a total number of the generated CRC bits; and transmitting the DCI including the masked CRC bits via a control channel to the first receiving node, a DCI format used with a first masking offset is different from a DCI format used with a second masking offset.

8. The transmitting node according to claim 7, wherein the first masking offset further indicates additional information not included in the DCI.

9. The transmitting node according to claim 7, wherein in the masking the n CRC bits among the generated CRC bits with bits of the RNTI, the processor further causes the transmitting node to perform:

determining a first start index of generated the CRC bits based on a default offset, the default offset indicating a default position for a CRC bits among the generated CRC bits arranged from a low index to a high index;

determining a second start index from the first start index based on the first masking offset; and masking CRC bits starting at the second start index among the generated CRC bits with the bits of RNTI.

10. The transmitting node according to claim 9, wherein the processor further causes the transmitting node to perform: when the second start index is greater than a last index of the CRC, determining the second start index according to a modulo operation on the second start index by a number of the CRC bits.

11. The transmitting node according to claim 9, wherein in the masking the n CRC bits starting at the second start index with bits of the RNTI, the processor further causes the transmitting node to perform: when a number of the CRC bits from the second start index to the last index is smaller than a number of bits of the RNTI, masking CRC bits starting a lowest index among the generated CRC bits with remaining bits of the RNTI.

12. The transmitting node according to claim 7, wherein the first masking offset is represented in form of a bitmap.

13. A control channel reception method of a receiving node, comprising:

receiving, from a transmitting node, downlink control information (DCI) via a control channel, the DCI including cyclic redundancy check (CRC) bits, wherein n CRC bits among the CRC bits included in the DCI are masked with bits of a radio network temporary identifier (RNTI) assigned to the receiving node, and n is an integer greater than or equal to 2 and less than a total number of the generated CRC bits;

channel-decoding the received DCI;

for each of a plurality of candidate masking offsets, removing masking from the n CRC bits using the bits of the RNTI;

performing a CRC check on the received DCI after removing the masking; and in response to detecting no error in the CRC check, determining a DCI format based on a first masking offset used for removing the masking, wherein a DCI format used with the first masking offset is different from a DCI format used with a second masking offset.

14. The control channel reception method according to claim 13, wherein the first masking offset used for removing the masking further indicates additional control information not included in the DCI.

* * * * *